US010629067B1

(12) United States Patent
Komoni et al.

(10) Patent No.: US 10,629,067 B1
(45) Date of Patent: Apr. 21, 2020

(54) SELECTIVE PREVENTION OF SIGNAL TRANSMISSION BY DEVICE DURING AIRCRAFT TAKEOFF AND/OR LANDING

(71) Applicant: Tive, Inc., Cambridge, MA (US)

(72) Inventors: Krenar Komoni, Arlington, MA (US); Robert Alan Vice, Wollaston, MA (US)

(73) Assignee: Tive, Inc., Cambridge, MA (US)

( * ) Notice: Subject to any disclaimer, the term of this patent is extended or adjusted under 35 U.S.C. 154(b) by 43 days.

(21) Appl. No.: 16/023,600

(22) Filed: Jun. 29, 2018

(51) Int. Cl.
*G08C 17/02* (2006.01)
*B64D 31/06* (2006.01)
*H04M 1/725* (2006.01)
*G07C 5/08* (2006.01)
*G01F 17/00* (2006.01)

(52) U.S. Cl.
CPC .............. *G08C 17/02* (2013.01); *B64D 31/06* (2013.01); *G01F 17/00* (2013.01); *G07C 5/08* (2013.01); *H04M 1/725* (2013.01)

(58) Field of Classification Search
CPC .. G06Q 10/0833; G06Q 10/08; G06Q 10/082; H04W 4/00
USPC .......................................................... 73/492
See application file for complete search history.

(56) References Cited

U.S. PATENT DOCUMENTS

| 5,313,848 | A | 5/1994 | Santin et al. |
| 7,057,495 | B2 | 6/2006 | Debord et al. |
| 7,233,247 | B1 | 6/2007 | Crossno et al. |
| 7,475,806 | B1 | 1/2009 | Crossno et al. |
| 7,538,681 | B1 | 5/2009 | Sharma et al. |
| 7,652,576 | B1 | 1/2010 | Crossno et al. |
| 7,791,455 | B1 | 9/2010 | MacLean, III et al. |
| 7,856,339 | B2 | 12/2010 | Vock et al. |
| 8,169,299 | B2 | 5/2012 | Sharma |

(Continued)

FOREIGN PATENT DOCUMENTS

| GB | 2546287 A | 7/2017 |
| GB | 2546288 A | 7/2017 |

OTHER PUBLICATIONS

U.S. Restriction Requirement dated Jan. 17, 2019 for U.S. Appl. No. 15/383,762; 8 Pages.

(Continued)

*Primary Examiner* — Natalie Huls
*Assistant Examiner* — Monica S Young
(74) *Attorney, Agent, or Firm* — Daly Crowley Mofford & Durkee, LLP

(57) ABSTRACT

Methods and apparatus processing acceleration data of a sensing device to determine whether the device is located on an aircraft during landing or taking off or in the air or landed. Based on a state of the sensing device, such as take-off, the sensing device is prevented from transmitting signals. In embodiments, the sensing device compares network identifying information stored in memory of the sensing device and locally received network identifying information. For at least one positive comparison of the network identifying information stored in the memory and the locally received network identifying information, the sensing device is prevented from transmitting signals. In embodiments, the acceleration data and the network identifying information provide independent ways to selectively prevent the sensing device from transmitting signals.

19 Claims, 21 Drawing Sheets

(56) References Cited

U.S. PATENT DOCUMENTS

| | | | |
|---|---|---|---|
| 8,280,682 B2 | 10/2012 | Vock et al. | |
| 8,428,904 B2 | 4/2013 | Vock et al. | |
| 8,502,672 B1 | 8/2013 | Crossno | |
| 8,626,193 B1 | 1/2014 | Crossno et al. | |
| 8,655,378 B1 | 2/2014 | Crossno et al. | |
| 8,660,814 B2 | 2/2014 | Vock et al. | |
| 8,818,351 B1 | 8/2014 | Crossno et al. | |
| 8,838,065 B1 | 9/2014 | Crossno et al. | |
| 8,868,102 B1 | 10/2014 | Crossno et al. | |
| 8,886,215 B1 | 11/2014 | Crossno et al. | |
| 8,886,216 B1 | 11/2014 | Crossno et al. | |
| 8,989,954 B1 | 3/2015 | Addepalli et al. | |
| 9,020,536 B1 | 4/2015 | Crossno et al. | |
| 9,064,225 B2 | 6/2015 | Nakra et al. | |
| 9,267,793 B2 | 2/2016 | Vock et al. | |
| 9,349,270 B1 | 5/2016 | Crossno | |
| 9,351,254 B2 | 5/2016 | Backholm et al. | |
| 9,412,260 B2 | 8/2016 | Kates | |
| 9,424,723 B2 | 8/2016 | Dubarry | |
| 9,888,363 B2 | 2/2018 | Addepalli et al. | |
| 10,037,508 B1* | 7/2018 | Rusnak | G06Q 10/1093 |
| 2002/0017989 A1 | 2/2002 | Forster et al. | |
| 2005/0157774 A1 | 7/2005 | DiLuiso et al. | |
| 2005/0267650 A1* | 12/2005 | Carpenter | G06F 1/26 |
| | | | 701/3 |
| 2006/0238347 A1 | 10/2006 | Parkinson et al. | |
| 2007/0072553 A1* | 3/2007 | Barbera | H04M 1/72577 |
| | | | 455/67.11 |
| 2007/0203650 A1 | 8/2007 | Jensen et al. | |
| 2007/0296277 A1 | 12/2007 | Lee et al. | |
| 2008/0004040 A1* | 1/2008 | Bogart | H04W 48/02 |
| | | | 455/456.1 |
| 2008/0214161 A1* | 9/2008 | Jakl | H04M 1/72572 |
| | | | 455/414.2 |
| 2009/0014837 A1 | 1/2009 | Park | |
| 2009/0061897 A1* | 3/2009 | Hamilton | G06Q 10/08 |
| | | | 455/456.2 |
| 2009/0113113 A1 | 4/2009 | Steele, Jr. et al. | |
| 2009/0215259 A1 | 8/2009 | Lee et al. | |
| 2009/0306839 A1 | 12/2009 | Youngquist et al. | |
| 2010/0248662 A1* | 9/2010 | Sheynblat | H04W 52/0274 |
| | | | 455/127.1 |
| 2010/0267375 A1* | 10/2010 | Lemmon | G06F 21/74 |
| | | | 455/418 |
| 2011/0125454 A1 | 5/2011 | Wengler | |
| 2011/0163412 A1 | 7/2011 | Park | |
| 2012/0149352 A1 | 6/2012 | Backholm et al. | |
| 2013/0060514 A1 | 3/2013 | Burke | |
| 2013/0321122 A1 | 12/2013 | Lee et al. | |
| 2013/0321211 A1 | 12/2013 | Chakraborty et al. | |
| 2013/0324059 A1 | 12/2013 | Lee et al. | |
| 2013/0324151 A1 | 12/2013 | Lee et al. | |
| 2013/0324152 A1 | 12/2013 | Lee et al. | |
| 2014/0018023 A1 | 1/2014 | Lee et al. | |
| 2014/0085055 A1 | 3/2014 | Lee et al. | |
| 2014/0187261 A1* | 7/2014 | Lee | H04W 52/0261 |
| | | | 455/456.1 |
| 2014/0235188 A1 | 8/2014 | Lee et al. | |
| 2014/0379605 A1 | 12/2014 | Herjólfsson et al. | |
| 2015/0070190 A1 | 3/2015 | Wai Fong et al. | |
| 2015/0241566 A1 | 8/2015 | Chakraborty et al. | |
| 2015/0262123 A1 | 9/2015 | Sharma et al. | |
| 2015/0296332 A1 | 10/2015 | Lee et al. | |
| 2015/0324742 A1 | 11/2015 | Herjólfsson et al. | |
| 2015/0339241 A1* | 11/2015 | Warner | G06F 13/10 |
| | | | 710/74 |
| 2016/0014554 A1 | 1/2016 | Sen et al. | |
| 2016/0021169 A1 | 1/2016 | Chan | |
| 2016/0036513 A1* | 2/2016 | Klippert | H04W 4/40 |
| | | | 455/15 |
| 2016/0116310 A1 | 4/2016 | Brynjúlfsson et al. | |
| 2016/0142891 A1 | 5/2016 | Virhia | |
| 2017/0050744 A1* | 2/2017 | Bredemeier | B64C 1/1407 |
| 2017/0074002 A1* | 3/2017 | Cooper | E05B 35/105 |
| 2017/0113813 A1* | 4/2017 | Heuer | B64D 45/0005 |
| 2017/0208426 A1 | 7/2017 | Komoni et al. | |
| 2018/0322454 A1* | 11/2018 | Komoni | G08C 17/02 |
| 2018/0336743 A1* | 11/2018 | Lonski | G01S 5/0018 |

OTHER PUBLICATIONS

Preliminary Amendment and Response to Restriction Requirement dated Jan. 17, 2019 for U.S. Appl. No. 15/383,762; Response filed Mar. 18, 2019; 8 Pages.

U.S. Non-Final Office Action dated May 31, 2019 for U.S. Appl. No. 15/383,762; 18 Pages.

AeroAstro Initiates SENS Remote Data Monitoring Service in North America; May 13, 2003; Retrieved from the internet on Jun. 16, 2017; URL http://www.spacedaily.com/reports/AeroAstro_Initiates_SENS_Remote_Data_Monitoring_Service_in_North_America.html; 3 Pages.

Response to U.S. Non-Final Office Action dated May 31, 2019 for U.S. Appl. No. 15/383,762; Response filed Sep. 30, 2019; 12 Pages.

U.S. Non-Final Office Action dated Jan. 9, 2020 for U.S. Appl. No. 15/383,762; 15 Pages.

* cited by examiner

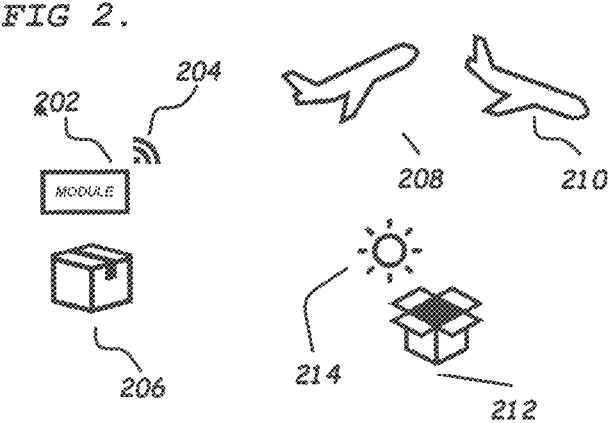

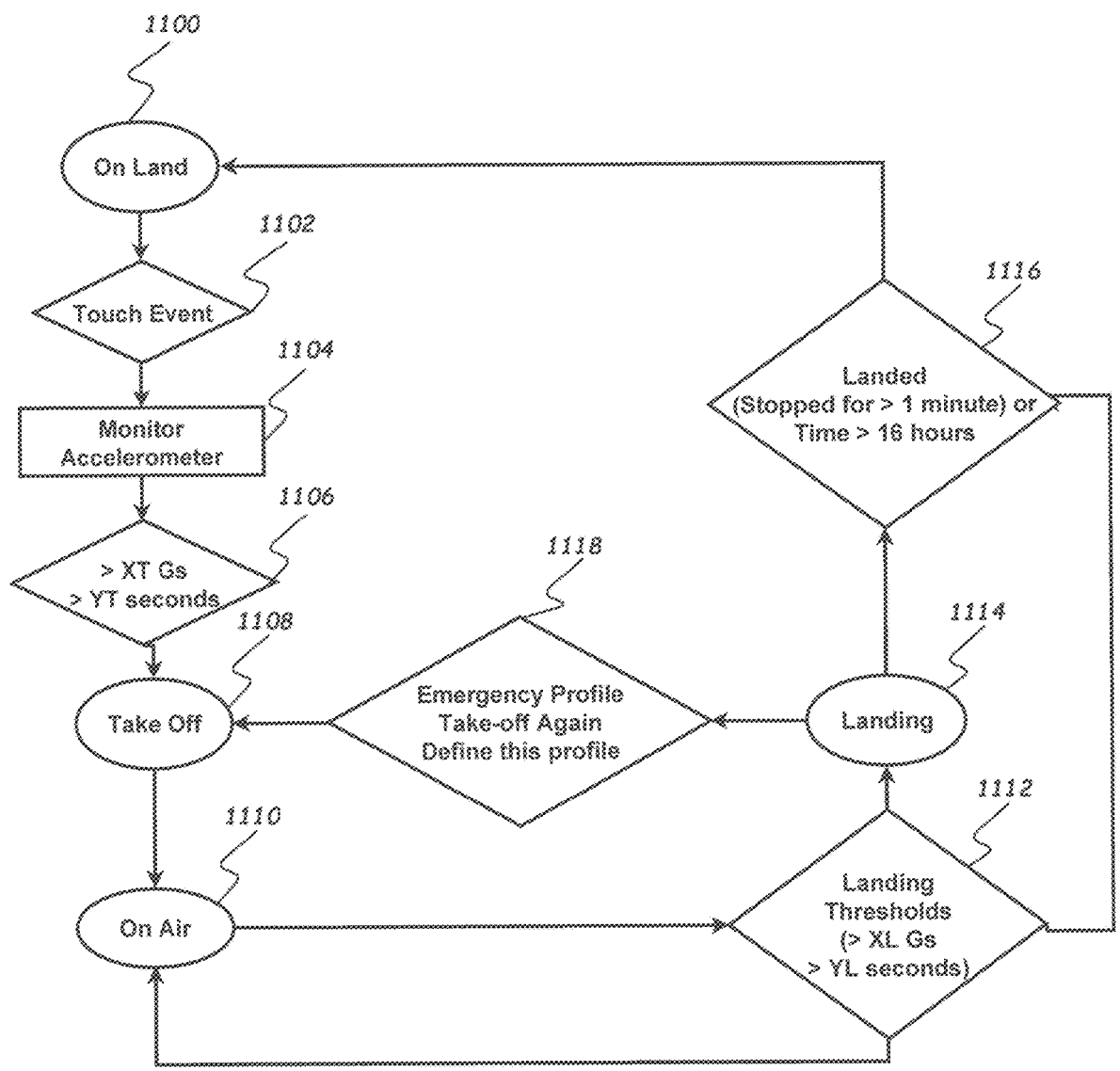
FIG. 11-A

FIG. 11-B
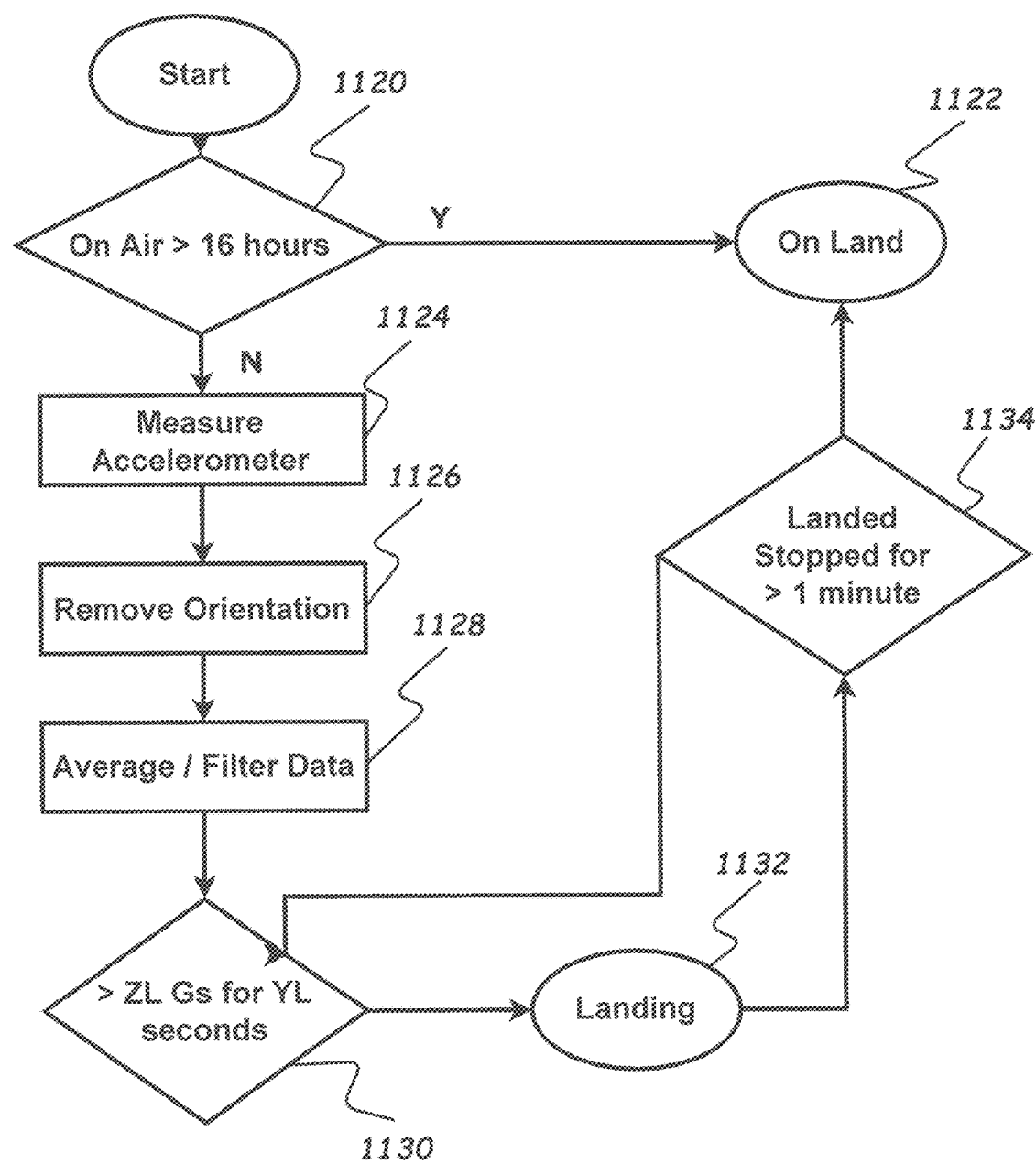

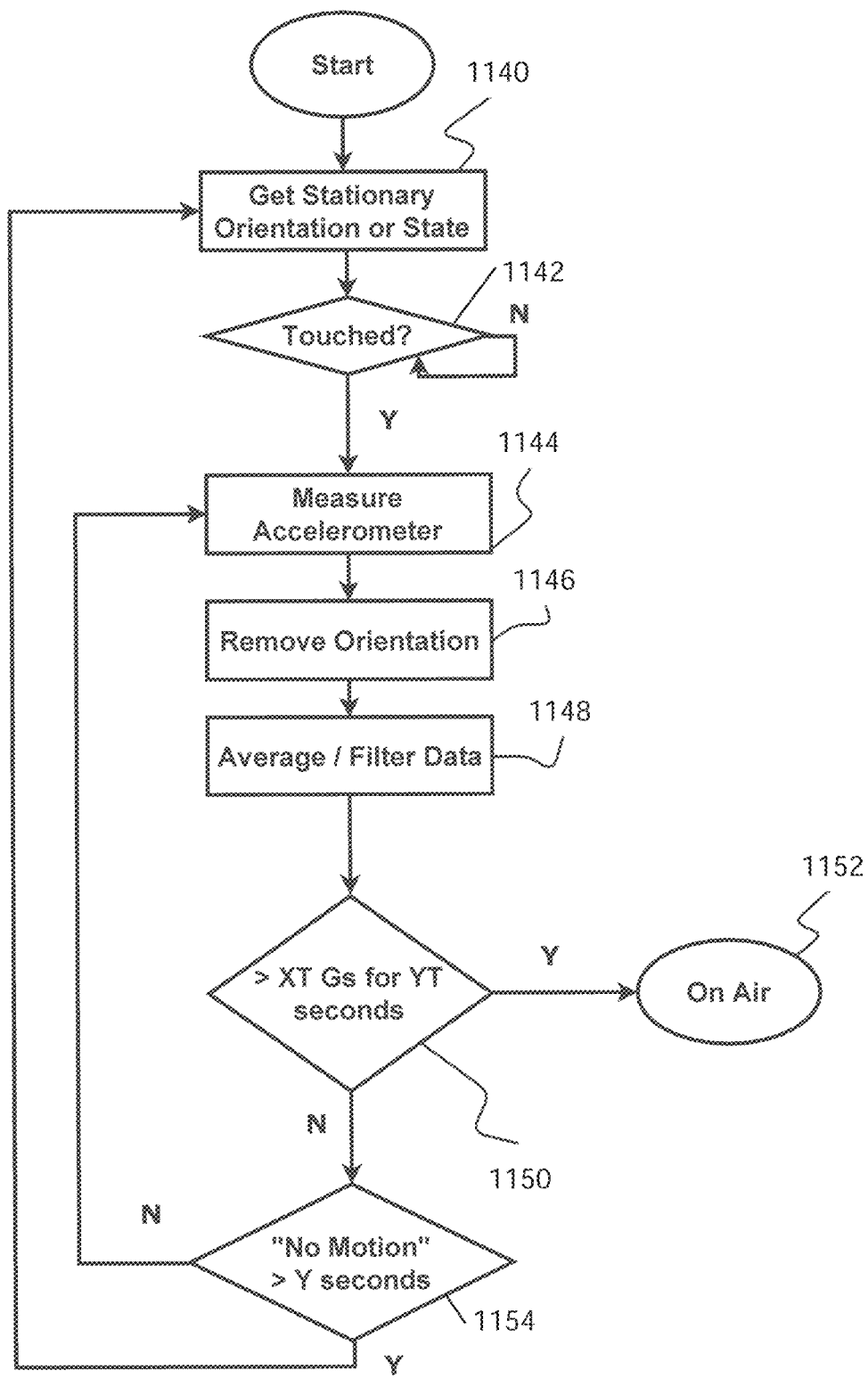
FIG. 11-C

FIG.11-D
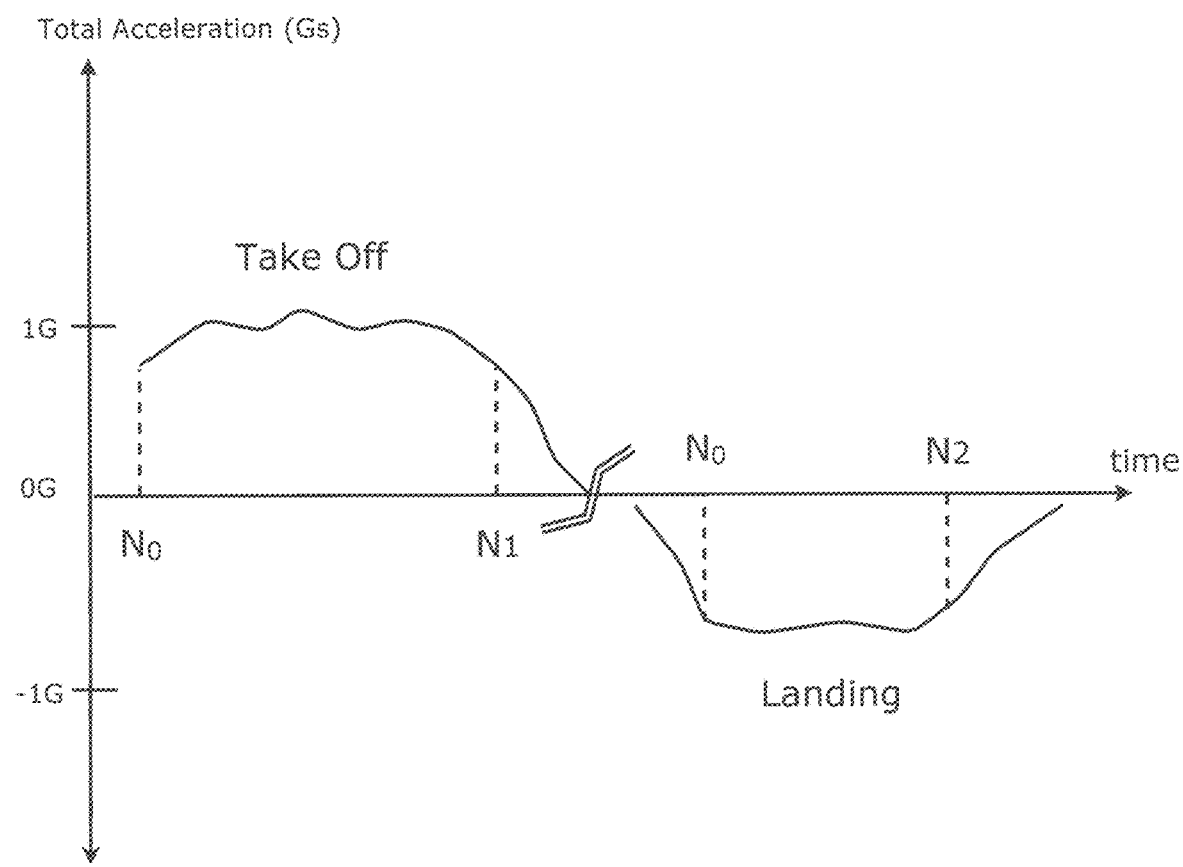

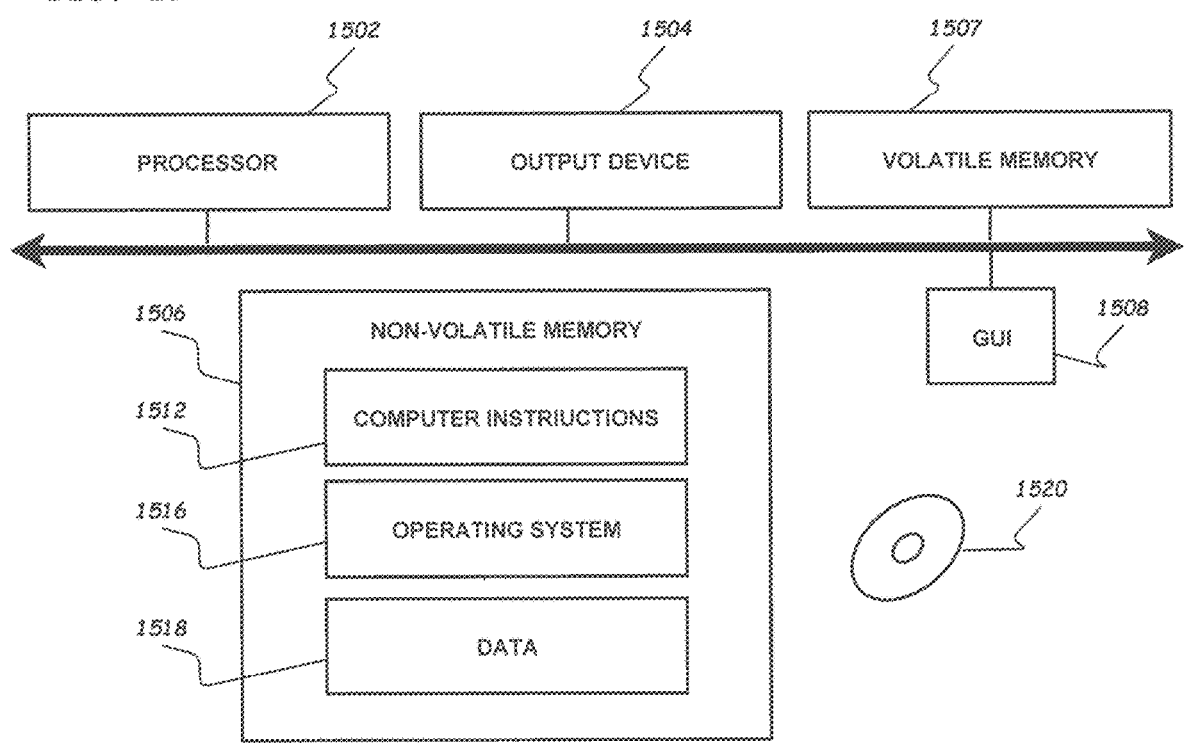

SELECTIVE PREVENTION OF SIGNAL TRANSMISSION BY DEVICE DURING AIRCRAFT TAKEOFF AND/OR LANDING

BACKGROUND

As is known in the art, sensors can include various components such as temperature, humidity, accelerometers, gyroscopes, magnetometers, and others. Such sensors can be used to collect data which can be processed.

SUMMARY

Embodiments of the invention provide methods and apparatus for sensing take-off, landing, in-flight, and/or other states for an aircraft or other vehicle. In one embodiment, a sensing device includes an accelerometer to obtain acceleration data for detecting take-off and/or landing of an aircraft. In embodiments, a sensor includes detecting and processing WiFi SSIDs and/or MAC addresses for determining the presence of an aircraft and/or an airport. As will be discussed further below, embodiments of the invention processing WiFi SSIDs and/or MAC addresses are distinguishable from using WiFi location services, such as a smartphone that actually transmits MAC addresses and RSSI numbers of the WiFi signals that are in the vicinity to the cloud to enable determination of the location of the device. Disadvantages of conventional approaches include the inability to determine location using transmission from an aircraft during times when transmission is not allowed. In embodiments of the invention, SSIDs/MAC addresses are sent to the sensing device, which is onboard the aircraft, e.g., in a shipping container, or inside an air-cargo where the device stores the information in memory for later comparison against local wireless network information to see if the sensor is in the vicinity of an aircraft and/or airport.

In embodiments, acceleration data and wireless network information can be used to selectively prevent signal transmission by a sensing device. It is understood that IATA/FAA regulations may require onboard equipment to prevent signal transmissions during take-off, in flight, and landing. Regulations may further require that two independent methods be used to prevent signal transmission.

In one aspect, a method comprises: processing acceleration data of a sensing device to determine whether the device is located on an aircraft during landing or taking off or in the air or landed; preventing the sensing device from transmitting signals when the aircraft is determined from the acceleration data to be taking off or landing; comparing network identifying information stored in memory of the sensing device and locally received network identifying information; and for at least one positive comparison of the network identifying information stored in the memory and the locally received network identifying information, preventing the sensing device from transmitting signals.

A method can further include one or more of the following features: enabling signal transmissions by the sensing device when the aircraft is landed, preventing the sensing device from transmitting signals from the acceleration data and from the network identifying information are independent of each other, preventing the sensing device from transmitting signals when the aircraft is taking off or landing requires at least one positive comparison of the network identifying information stored in the memory and the locally received network identifying information and a determination that the device is located on an aircraft during landing or taking off from the acceleration data, processing the acceleration data of the sensing device further includes detecting acceleration above a first threshold for more than a first selected number of samples per time period to determine that the aircraft is taking off, processing the acceleration data of the sensing device further includes detecting deceleration above a second threshold for more than a second selected number of samples per time period to determine that the aircraft is landing, processing the acceleration data of the sensing device further includes detecting a given number of shocks within a given time interval to determine that the aircraft is landing, the shocks could be programmed (i.e. decreasing in magnitude over time), enabling transmissions by the sensing device when a duration of the sensing device in the in air state exceeds a given amount of time, the stored network identifying information includes SSIDs, the stored network identifying information includes a first one of the SSIDs having multiple MAC addresses, identifying a sequence of locally received network identifying associated with a route to determine that the aircraft has landed, the network identifying information stored in memory of the sensing device is associated with an expected route for the aircraft, identifying a location of the sensing device from the locally received network identifying information, which includes at least one SSID having geographic identifying information, the geographic identifying information of the SSID includes a city name and/or airport name, storing and transmitting the locally received network identifying information, and/or receiving a signal generated from actuation of a button on the sensing device indicating that the sensing device is being shipped.

In another aspect, a sensing device comprises: an accelerometer module to sense acceleration data; a signal processor module coupled to the accelerometer module and configured to process the acceleration data for determining whether the sensing device is located on an aircraft during landing or taking off or in the air or landed; transmission control module coupled to the signal processor module and configure to prevent the sensing device from transmitting signals when the aircraft is determined from the acceleration data to be taking off or landing; and a wireless communication module coupled to the signal processor module and configured to compare network identifying information stored in memory of the sensing device and locally received network identifying information, wherein the transmission control module is further configured to, for at least one positive comparison of the network identifying information stored in the memory and the locally received network identifying information, prevent the sensing device from transmitting signals.

A system can further include one or more of the following features: enabling signal transmissions by the sensing device when the aircraft is landed, preventing the sensing device from transmitting signals from the acceleration data and from the network identifying information are independent of each other, preventing the sensing device from transmitting signals when the aircraft is taking off or landing requires at least one positive comparison of the network identifying information stored in the memory and the locally received network identifying information and a determination that the device is located on an aircraft during landing or taking off from the acceleration data, processing the acceleration data of the sensing device further includes detecting acceleration above a first threshold for more than a first selected number of samples per time period to determine that the aircraft is taking off, processing the acceleration data of the sensing device further includes detecting deceleration above a second threshold for more than a second selected number of samples per time period to determine that the aircraft is landing, processing the acceleration data of the sensing device further includes detecting a given number of shocks within a given time interval to determine that the aircraft is landing, the shocks decrease in magnitude over time, enabling transmissions by the sensing device when a duration of the sensing device in the in air state exceeds a given amount of time, the stored network identifying information includes SSIDs, the stored network identifying information includes a first one of the SSIDs having multiple MAC addresses, identifying a sequence of locally received network identifying associated with a route to determine that the aircraft has landed, the network identifying information stored in memory of the sensing device is associated with an expected route for the aircraft, identifying a location of the sensing device from the locally received network identifying information, which includes at least one SSID having geographic identifying information, the geographic identifying information of the SSID includes a city name and/or airport name, storing and transmitting the locally received network identifying information, and/or receiving a signal generated from actuation of a button on the sensing device indicating that the sensing device is being shipped.

In a further aspect, a system comprises: a sensing device, comprising: an accelerometer module to sense acceleration data; a signal processor means coupled to the accelerometer module for processing the acceleration data for determining whether the sensing device is located on an aircraft during landing or taking off or in the air or landed; a transmission control means coupled to the signal processor means for preventing the sensing device from transmitting signals when the aircraft is determined from the acceleration data to be taking off or landing; and a wireless communication means coupled to the signal processor means for comparing network identifying information stored in memory of the sensing device and locally received network identifying information, wherein the transmission control means, for at least one positive comparison of the network identifying information stored in the memory and the locally received network identifying information, prevents the sensing device from transmitting signals.

BRIEF DESCRIPTION OF THE DRAWINGS

FIG. 2 illustrates an exemplary asset tracking process using a sensing device.

FIG. 11A is a flow diagram of a high level example process for determining a state of a sensing device at or near an airport and/or aircraft using accelerometer data.

FIG. 11B is a flow diagram of an example process for determining a landing state of a sensing device at or near an airport and/or aircraft using accelerometer data.

FIG. 11C is a flow diagram of an example process for determining an in air state of a sensing device at or near an airport and/or aircraft using accelerometer data.

FIG. 11D is a graphical representation of example acceleration data for example take-off and landing scenarios.

FIG. 15 is a block diagram of an example computer that can perform at least a portion of the processing described herein.

DETAILED DESCRIPTION

FIGS. 1A-1E illustrate an exemplary multi sensor electronic device 100 having signal transmission control in accordance with one or more embodiments. For example, RF transmissions may need to be shut off at certain times, such as during take-off and landing of an aircraft. In addition, two independent methods may be required to detect take-off and/or landing events to ensure transmissions are off at prohibited times.

Figure 1A:
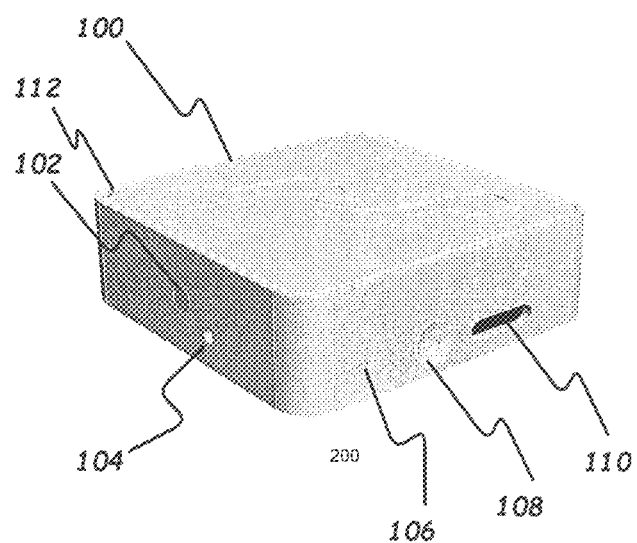
FIG. 1A is a perspective view of an exemplary electronic sensor device having selective signal transmission shut off in accordance with one or more embodiments.

FIG. 1A illustrates an exemplary multi sensor electronic device 100 in accordance with one or more embodiments. The device 100 has an outer case with a power button 108, which is used to turn on and off the device 100. The power button 108 can also be used to check the battery life of the device by pressing the button for a short time (e.g., less than a second). In one or more embodiments, a single multi-color (red, green, and blue) LED light 102 is used to indicate the status and the states of the device. The functionalities that the notification LED 102 can show include: battery power, cellular connectivity, GPS/GNSS connectivity, WPAN/WLAN/WWAN connectivity, various malfunctions, an OK (all good) status, and other features of the device. The blinking of the LED 102 and its colors can be programmed to indicate these features and various other notifications. The power button 108 pushing sequence and pushing length can also be programmed such that these various states of the device can be checked, or device actions can be performed.

In embodiments, the type C USB port (or other port such as, e.g., a mini or micro USB port) 110 is a multi-function port that can be used for one or more of the following: (1)

for charging the battery, (2) to connect an external battery and extend the operation of the device, (3) to power the device where the LED 106 would light up, (4) to configure the device and update the firmware, and/or (5) to send other data such as sensor data through USB 110. This USB can also be utilized to communicate using other protocols with an adapter for UART/SPI/I2C or others and then sending data using those other protocols. In addition, the USB port can be used to connect two or more devices together so that they can share data between their sensors, processors, and/or their modules and utilize each other's wireless communication capabilities.

In embodiments, there are multiple sensors placed on the device. In some embodiments, sensors are provided for sensing of environmental conditions, ambient light, and/or infrared light. In order to perform these functions, the device utilizes sensors that measure: temperature, humidity, air pressure, acceleration, rotation, motion, and/or light, and they could be internal to the device or external sensors that communicate with the device using wireless communications such as BLE, WiFi, ZigBee, or other proprietary or open standards available. In one embodiment, an opening window 104 is provided enabling air flow and light to enter the device case. The general-purpose hole or lanyard hole 112 can be used for attaching the device to keys, bags, cars, and other things.

Figure 1B:
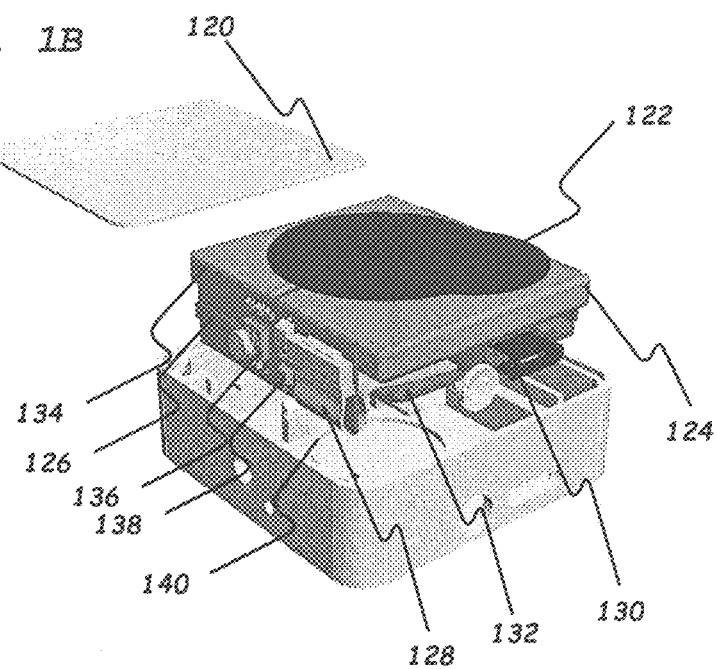
FIG. 1B is an exploded view of the FIG. 1A device.
Figure 1C:
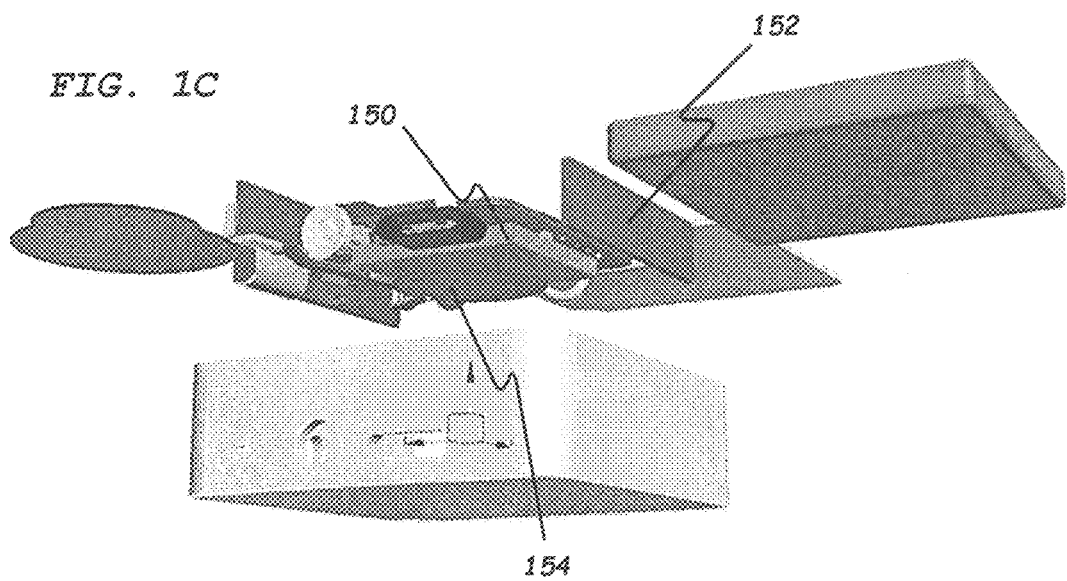
FIG. 1C is a further exploded view of the FIG. 1A device.
Figure 1D:
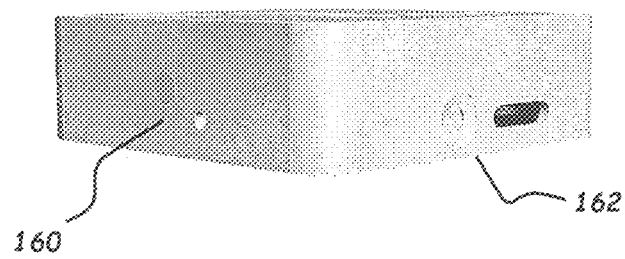
FIG. 1D is a further perspective view of the FIG. 1A device.
Figure 1E:
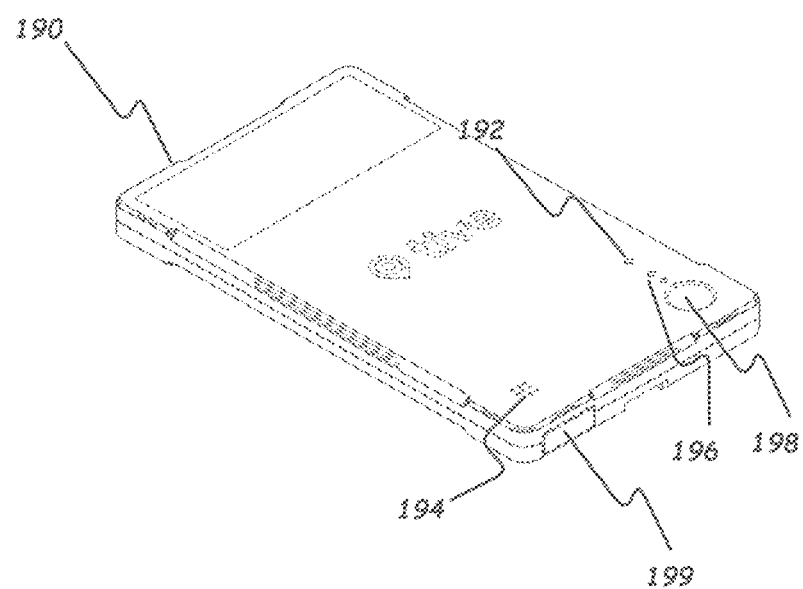
FIG. 1E is a perspective view of another exemplary electronic sensor device having selective signal transmission shut off in accordance with one or more embodiments.

FIG. 1E illustrates an exemplary multi sensor electronic device 190 in accordance with one or more embodiments. The device 190 has an outer case with a power button 198, which is used to turn on and off the device 190. The power button 198 can also be used to check the battery life of the device by pressing the button for a short time (e.g., less than a second). In one or more embodiments, a single multi-color (red, green, and blue) LED light 196 is used to indicate the status and the states of the device. The functionalities that the notification LED 196 can show include: battery power, cellular connectivity, GPS/GNSS connectivity, WPAN/WWAN connectivity, various malfunctions, an OK (all good) status, and other features of the device. The blinking of the LED 196 and its colors can be programmed to indicate these features and various other notifications. An opening window 192 is used for the light to enter the device case, and that is the location of a light sensor under the light-pipe that can be placed in that opening. The power button 198 pushing sequence and pushing length can also be programmed such that these various states of the device can be checked, or device actions can be performed.

In embodiments, the type C USB port (or other port such as, e.g., a mini or micro USB port) 199 is a multi-function port that can be used for one or more of the following: (1) for charging the battery, (2) to connect an external battery and extend the operation of the device, (3) to power the device where the LED 196 would light up, (4) to configure the device and update the firmware, and/or (5) to send other data such as sensor data through USB 199. This USB can also be utilized to communicate using other protocols with an adapter for UART/SPI/I2C or others and then sending data using those other protocols. In addition, the USB port can be used to connect two or more devices together so that they can share data between their sensors, processors, and/or their modules and utilize each other's wireless communication capabilities.

In embodiments, there are multiple sensors placed on the device. In some embodiments, sensors are provided for sensing of environmental conditions, ambient light, and/or infrared light. In order to perform these functions, the device utilizes sensors that measure: temperature, humidity, air pressure, acceleration, rotation, motion, and/or light, and they could be internal to the device or external sensors that communicate with the device using wireless communications such as BLE, WiFi, ZigBee, or other proprietary or open standards available. In one embodiment, an opening window 194 is provided enabling air flow and light to enter the device case.

FIG. 1B illustrates an exploded view of the electronic device 100 where various internal parts are shown in more detail. The case cover 120 includes a lanyard hole 112. The device includes a GPS/GNSS antenna 122, which can be a flexible omnidirectional antenna. The battery 124 is placed on the device and it could be smaller or larger than the one shown in the figure. The device can include a Bluetooth or WiFi antenna, which can be provided as a chip antenna 126. The type C USB connector 130 for recharging the battery can also be used to program the micro controller. In embodiments, the main PCB 132 and the side PCB 134 of the device are connected using a ribbon type cable 128. The side PCB 134 also contains a light sensor 136 and the temperature/humidity/pressure/volatile organic compound (VOC) sensor 138. The device includes an alarm buzzer placed in the circle shaped space 140. A double-sided tape or other adhesive can be used to attach the buzzer to the case such that it can cause vibrations and sound can be emitted out of the device.

FIG. 1C illustrates another angle of the device showing a 2G/3G/4G cellular antenna as a PCB antenna 152, the buzzer 154, and a cellular module 150. The antennas can be designed for world-wide coverage.

FIG. 1D shows the device from a perspective in which LED 160 and power button 162 are both visible. Power button 162 is used to switch the device on or off, check status, and push data to the cloud. Each of these actions may be accomplished by different inputs using the power button and results in an output from the LED 160, in the form of either red, green or blue light combination. Additional detail of an example sensor is shown and described in U.S. Patent Publication No. 2017/0208426, which is incorporated herein by reference.

FIG. 2 shows an exemplary asset tracking application using a multi-sensor device 202 in accordance with one or more embodiments. The device is used to track and trace packages 206 during transportation in this example. In one embodiment, the multi-sensor device with wireless connectivity can be utilized to track/monitor the location, temperature, humidity, pressure, presence of VOCs, motion, handling, shock, and see if the package has been opened by interpreting data from an ambient light sensor or a proximity sensor. The update rates for each measurement can be modified remotely and can be programmed to connect to a network a selected number of times per period, where the period is some number of seconds, minutes, hours or days.

Tracking of the package can be visualized from its source to its destination. The pressure sensor and the accelerometer on the device can be used to determine the shipping method: ground or air. If the package is being transported by ground the pressure sensor will sense a certain range of pressure values that correspond with measurements of less than a few thousand feet above sea level and accelerometer readings that can correlate to accelerometer reading produced by an automobile, truck, or other means of ground transportation.

If the package is being transported by air, the pressure sensor will detect altitudes that are above 10,000 feet above sea level, for example, and sense accelerations within in a time period that can only be produced by an aircraft during takeoff 208 or landing 210. In embodiments, a sensor detects rate of change on air pressure inside a pressurized aircraft.

If the pressure changes are greater than a selected number of Pascals per second that corresponds to the pressure changes inside a cabin of an aircraft. The other way would be to set a threshold so that when the pressure inside an aircraft is greater than a given number of Pascals (corresponding to a level at which aircrafts are usually normally pressurized to), and then turn off any radio transmission capabilities. In embodiments, a pressure sensor could detect the pressure inside an aircraft, which is usually pressurized between 11 and 12 psi, typically at 11.3 psi, when the aircraft is airborne above 10,000 feet, and then turn off any radio transmission capabilities. This mechanism can also be used to independently turn off all radios on the device to comply with FAA or other flight regulations. Additional embodiments that use accelerometer information for radio control are described below.

Turning off the radio causes the device to stop sending sensor measurement data to the cloud. However, the device continuously monitors the status of the package and stores the readings in its memory. An advantage of the device is that it has a memory that communicates to the microcontroller and it can store sensor data with timestamps during transportation of the package. Once connectivity conditions are met, the WWAN, WLAN, or WPAN radios are turned on to establish connectivity to the cloud and transfer the data based on the available wireless connections to the cloud.

Devices in accordance with various embodiments can be operated in various other configurations. For instance, in one example, the device can be configured to stay in sleep mode until there is a movement of the package detected by analyzing the accelerometer sensor data. Once the movement is detected the package can be tracked and traced continuously for a certain amount of time, or indefinitely until it runs out of battery power depending on the setup by the end user. This feature could allow the device to operate longer and save on its battery power. In another example, the device can be configured to be in sleep mode and only wake up once there is a change detected by the ambient light sensor, such as package being opened 212, or any other scenario where the ambient light sensor can change due to light 214 exposures.

In a further example, the device is configured to continuously track temperature or humidity and it can be setup to send an alert once a particular threshold is reached, enabling the safe and efficient transportation of items that are sensitive to temperature or humidity. In another example, the device is configured to monitor how the package has been handled by using the accelerometer sensor. For example, if a fragile package is thrown, tossed or moved in an undesired fashion during shipment, this data can be stored and reported back to the cloud. This can also apply for the orientation of the shipment as there are shipments that require particular orientation during transportation, such as refrigerators, stoves, server racks, and other appliances or electronics. The device can be attached inside the box used to transport these items and the orientation can be tracked and recorded in real-time.

Figure 3:
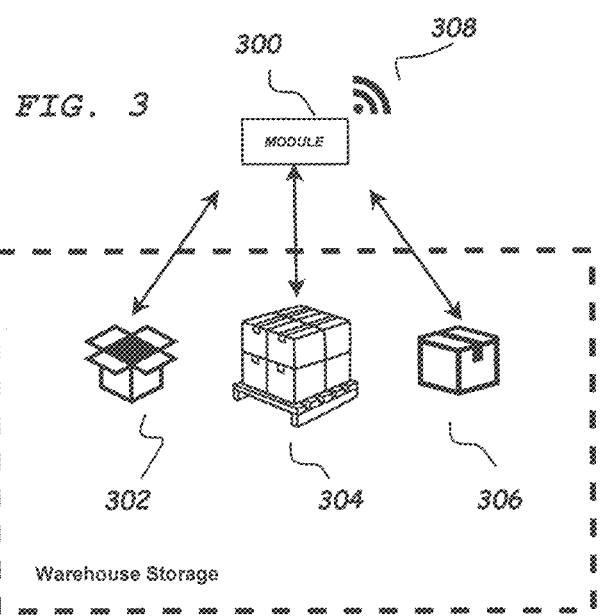
FIG. 3 illustrates an exemplary tracking application using a sensor device.

FIG. 3 illustrates an exemplary motion detection application in accordance with one or more embodiments. In this example, there are various items stored in a warehouse (location) 310 where they are supposed to be stored for multiple days or weeks and not be tampered with. For these types of applications, the device 300 can be placed inside a pallet 304, boxes 306, parcels 302, or other assets in a warehouse (other facilities). The device then can be programmed to stay in sleep mode until there is an actual motion detected by the accelerometer or gyroscope motion detector chipset. This motion can lead to the device waking up and sending a signal to the cloud and informing the end user that there has been tampering on the asset or item at which the device was placed in.

In another illustrative embodiment, the device 300 is placed in one of the assets shown below it: a package 302, a pallet 304, or any other asset 306. The assets are inside a warehouse, but they could be anywhere where tampering of the assets is not permitted for a certain period of time. In this case the device 300 is configured such that the majority of time is kept in sleep mode and once motion is detected it wakes up and utilizes the WPAN, WLAN, or WWAN connectivity 308 to send information to the cloud about the whereabouts of the device, using GPS/GNSS based location, cellular based location, WiFi based location and also send additional information regarding the motion detection due to tampering of the tracked device and the abrupt changes on the accelerometer or gyroscope readings.

Figure 4:
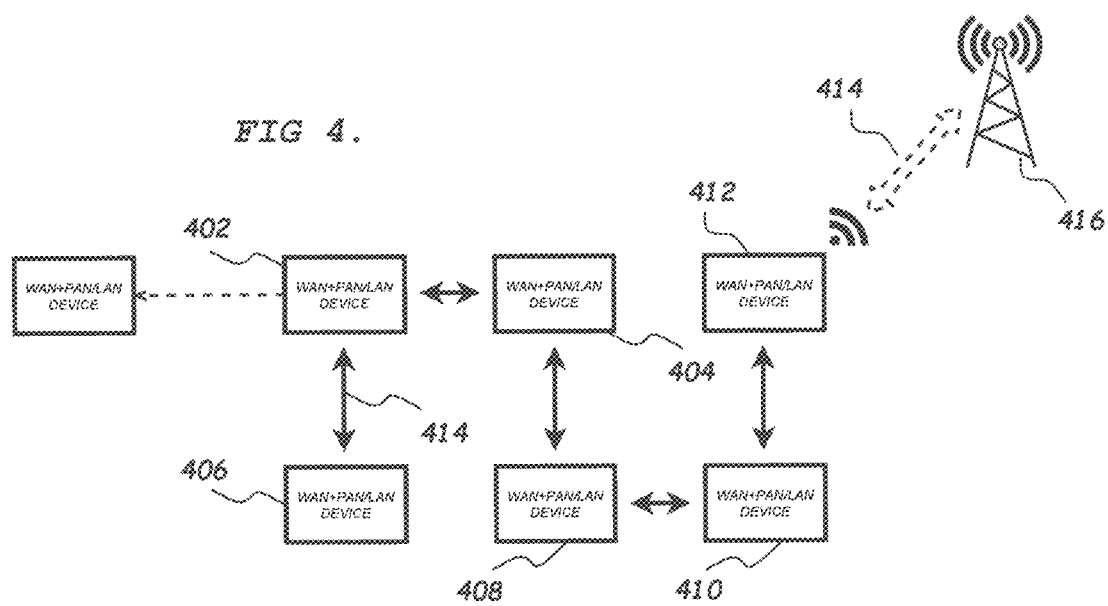
FIG. 4 illustrates an exemplary mesh-network configuration for multiple sensing devices.

FIG. 4 shows an exemplary mesh network application in accordance with one or more embodiments with a combination of personal and Wireless Wide Area Network modules and chipsets. In one or more embodiments, a mesh network between the devices 402, 404, 406, 408, 410, and 412 is created using either USB connection or Wireless Personal Area Network (WPAN) connectivity such as Bluetooth, Bluetooth Low Energy, Bluetooth Smart, ZigBee, Z-Wave, or other low power wireless communication protocols. In this scenario, even though the devices (two or more) have WWAN 414 connectivity such as cellular, LoRa, Sigfox, or others, one of the devices is assigned to be the master (or designated device) to connect through WWAN 414 such as shown in FIG. 4 where only device 412 is connected to the WWAN.

In another embodiment the device containing WWAN+WPAN+WLAN, WWAN+WPAN, or WWAN+WLAN connectivity combinations could be utilized for reducing or minimizing power consumption. In one or more embodiments, six devices 402, 404, 406, 408, 410, 412 are shown. Initially, device 412 is connected to WWAN, and the device 412 will remain connected to the WWAN network for as long as the battery of the device reaches a certain percentage, such as 20%, 30% or any other percentage threshold. All the sensor readings from the other devices will be transferred to the WWAN connected device 412 through WPAN or WLAN through mesh or direct transfer method. Once that battery threshold is reached, the WWAN connectivity is turned off at the device 412 and WWAN of the next device 410 is utilized, and this continues with all other consecutive devices until the batteries of all devices are fully consumed as WWAN connectivity is a power-hungry connectivity method when compared with the other modules inside the electronic device. The data flow in this example goes from device 412 to 410 through WPAN or WLAN connection, and 410 then sends the received data to the cloud through its WWAN connectivity.

Figure 5:
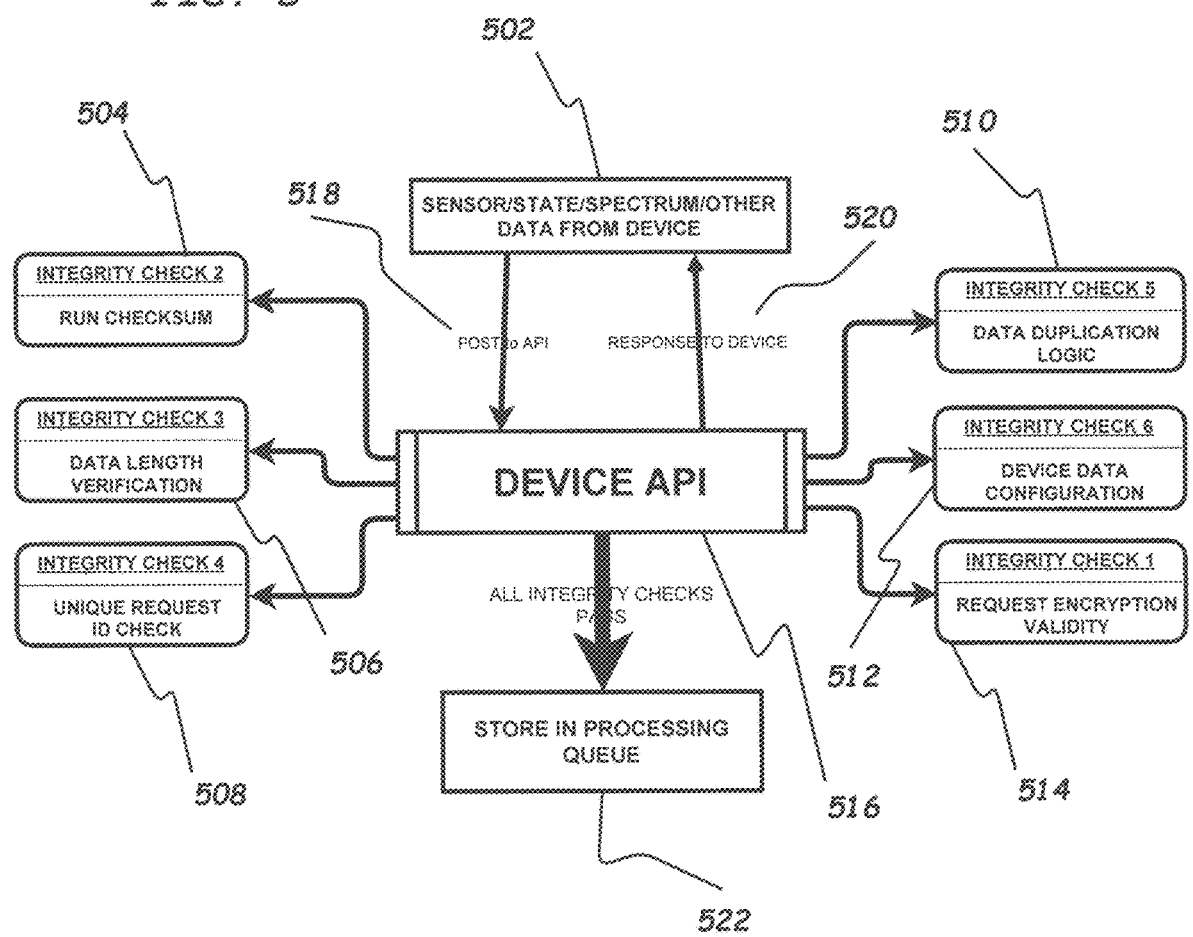
FIG. 5 is a block diagram illustrating an exemplary cloud-based architecture for accepting and sending data to sensing devices.

FIG. 5 illustrates an exemplary device and cloud architecture and how the data flows from the device to the actual database tables on the cloud. In one embodiment, the cloud platform could be custom, or it could utilize one of the well-known cloud platforms such as Google Cloud Platform, Amazon AWS, Microsoft Azure, or other custom backend platform. In another embodiment, the device 502 sends the sensor data, spectrum data, network characteristics data, and any other data available from the device such as Bluetooth network characteristics and any Bluetooth beacons that the device can sense around its area. There are multiple POST/GET methods that can be utilized to send the data to the server.

In another embodiment, the data is sent using the POST method 518 as an HTTP request to the server. As an underlying protocol, TCP, UDP, or other protocols can be utilized for communication to the cloud from the device. Once the Device API 516 receives the data it runs through multiple checks to validate that the data is coming from a real device, it has not been altered, and that the server is not being attacked with malicious hits. In order to read the data, the decryption 514 of the data is performed. The decryption happens using a key that is unique to the device. The keys are securely stored internally on the device and on the server and accessed only when decryption of the data occurs. After decryption, the integrity of the received and decrypted data string is double checked using a checksum 504 such as CRC16, CRC32, or others, if that passes, the length of the data 506 is verified. For each transaction, there is a unique request ID that is generated and checks if the request ID 508 is different from the last transaction. In order to mitigate Denial of Service (DoS) attacks, a duplication check 510 is performed to make sure that the same string is not being sent over and over again by an unauthorized client, where SSL is not utilized. In this case any duplicate data is ignored, this check most likely will not occur as it would have failed the unique request ID check 508. If the above checks pass, a last check 512 of confidence is performed to verify that the incoming data from the device correlates with the configuration of the device. For instance, if the data is being sent every minute and the device is configured to send every 15 minutes, this raises a flag. The device is then checked to make sure that the update rate is set to the client's desired update rate of every 15 minutes. Device API also communicates back to the actual device hardware with response such as SUCCESS of reception of data, and/or ERROR ###, where ### is an error number corresponding to an issue that the device has experienced. Upon successful checks, the device API also responds 520 to the device for "Successful Reception" of data or an error code showing the reason why the data reception failed. If there are any configuration changes on the device, those are also sent at this time. In addition to responding to the device, the device API sends all the verified data to a queue for further processing, computation and storage.

Figure 6:
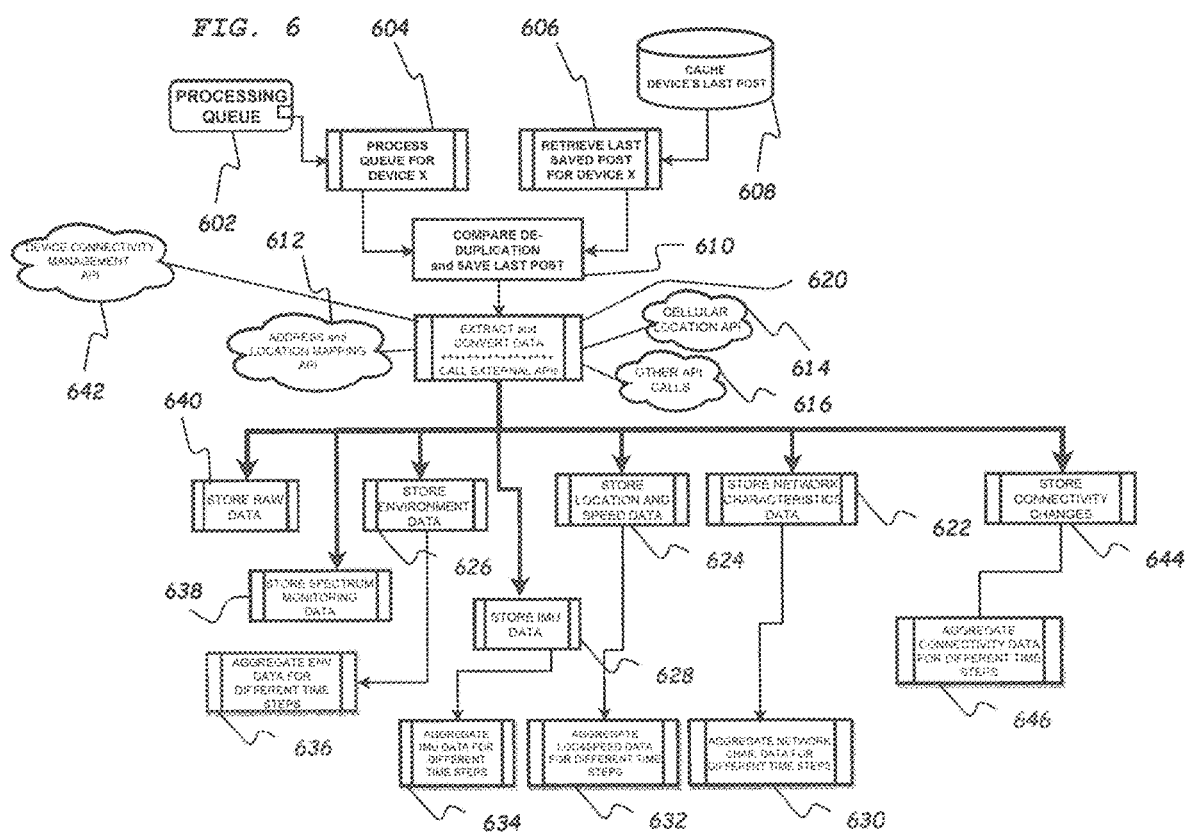
FIG. 6 is a block diagram illustrating an exemplary cloud-based architecture for processing data that is obtained by a sensing device and data from external API calls.

FIG. 6 illustrates an exemplary method in accordance with one or more embodiments of processing the data that has been placed in queue by the device API shown in FIG. 5. After the data has been Queued, a First-In-First-Out (FIFO) approach is implemented and scalability will be executed depending on the latency of the last queued message. As the latency increases, more resources are allocated to process 602 the queued data in parallel. Once the device message is retrieved 604 from the queue, another function also retrieves the last stored message for that particular device from cache 608. In order to minimize cellular data usage, duplicate data from device are ignored and only data that changed from the previous message are sent to cloud. This reduces data charges and creates a de-duplication algorithm from which the device operates in. In order to support this approach to data de-duplication, the API receiving the data requires an additional function 610, which compares the received message with the last cached message. The new data from the comparison then is saved in place of the last cached message. After this step, the data is extracted 620 into multiple fields using a JSON parser or a delimiter parser depending on the data format used during transmission, and each field will be stored in its appropriate data table 640 638 628 626 624 622 644. Prior to storing the data on tables, external APIs are called to extracted further data, such as street address and mapping points 612 from longitude and latitude data received from the device's GPS/GNSS. Another external API that is the cellular based location API (such as Combain, UnwiredLabs, OpenCellID, and/or others) 614 is called to obtain an approximate location based on the Local Area Code (LAC), Mobile Network Code (MNC), Mobile Country Code (MCC), and CellID information obtained from base-stations near the device, providing additional information on the location of the device if there is no GPS availability. Another external API that is the cellular based location API (such as Combain, Unwired Labs, Google, and/or others) 616 is called to obtain an approximate location based on WiFi SSID and RSSI values available in the proximity of the device. In addition to data related APIs, other APIs 616 such as Wi0Fi location or others could also be called to further enrich the raw data received from the device. Another example of additional APIs would be temperature, humidity, and pressure related API. Based on raw location data, outside temperature, pressure, and humidity can be obtained using an external API (such as Accuweather, Weather.Com, and/or others) and that data can be stored for future or immediate correlative comparison to determine whether the device is outdoors or indoors. In addition, device connectivity management APIs 642 are also utilized to observe connectivity session times, data usage, network carrier information, and others. These data points are then combined and stored into multiple tables. Raw data from the device is stored in a raw data table 640. Spectrum monitoring data is stored in a separate table 638, and all the environmental data are stored in table 626. An additional aggregation function is also performed on the environmental data in order to improve the performance and reduce latency at the end user application. This aggregated data is then stored in multiple tables 636 for various time steps. The same also occurs for the Inertial Measurement Unit (IMU) data 628 634, location and speed data 624 632, network characteristics data 622 630, connectivity related data 644 646, motion detection data and other data that goes into processing queue.

Figure 7:
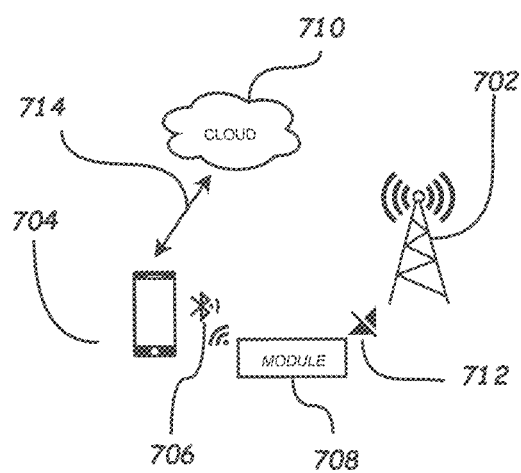
FIG. 7 illustrates an exemplary connection of a sensing device to the cloud through a combination of WPAN, WLAN, and/or WWAN enabled wireless communication.

FIG. 7 shows the device connecting to cloud through another WPAN and WLAN/WWAN enabled device in accordance with one or more embodiments. In the illustrated example, the device is connected through WPAN 706 (Bluetooth Smart or BLE in this case, and others are possible) to a smartphone 704. The device transfers all the sensor readings and other data that it needs to send 714 to the cloud 710 to an app inside the smartphone 704 that connects to the device 708 directly through WPAN. This can occur when the device 708 is synchronized with a smartphone 704 through an app that recognizes the device 708 and it accepts data from the device and then sends it to the cloud 710 so that it can be consumed and utilized by a web application, smartphone app, desktop-based software, or other tool. In this case the device could lose the WWAN/WLAN based connectivity, as shown in 712, and connect to the smartphone 704 through its WPAN enabled connectivity to conserve energy and use a lower power solution such as Bluetooth 706 connection instead of the device's cellular connection 712 to indirectly connect to WWAN or a cell tower 702 as shown in one embodiment.

Figure 8:
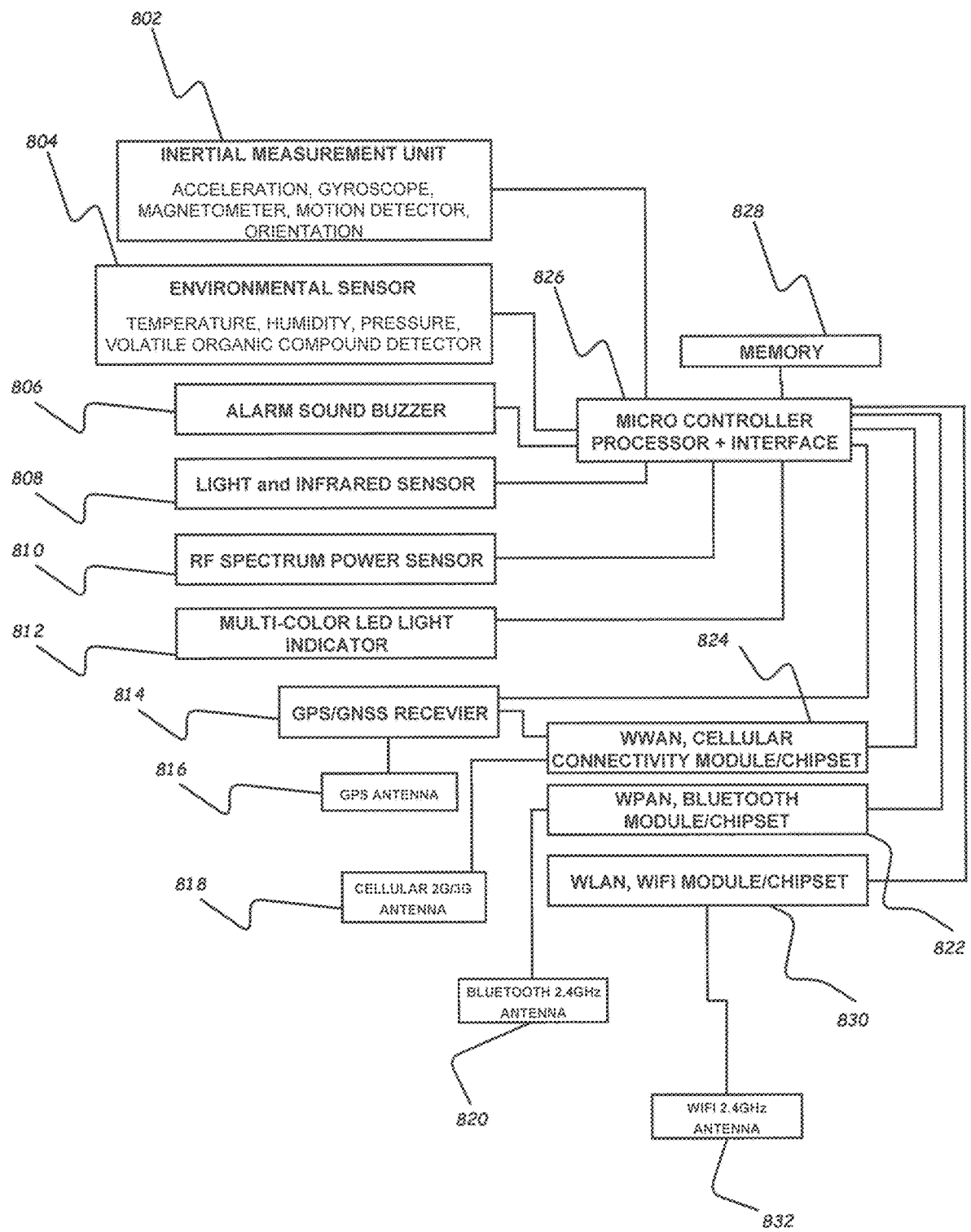
FIG. 8 is a block diagram illustrating components of an exemplary sensing device.

FIG. 8 is a block diagram illustrating components of a multi-sensor electronic device in accordance with one or more embodiments. The device includes a microcontroller (MCU) 826, such as STM32 which is an ARM based microcontroller, or any other microcontroller or microprocessor. The memory 828 is also connected to the MCU and the sensor data can be saved on the memory when the wireless connectivity is not available to send the data to the Internet. The device includes multiple sensors including, but not limited to: (1) inertial measurement unit (IMU) 802, which has an accelerometer, gyroscope, magnetometer, motion detector, and orientation output for the device, (2) environmental sensors, which are comprised of a temperature sensor, humidity sensor, pressure sensor, and volatile compound detector 804, (3) visible light and infrared sensor 808, (4) radio frequency (RF) spectrum power sensor 810 for various frequencies in the cellular bands. The device further includes GPS/GNSS receiver 814 to provide longitude, latitude, speed, and other information that is available from GPS/GNSS receivers. The device also includes alarm sound buzzer 806 used for finding the device or for any alerts or system information. The device also includes a multi-color LED indicator. The device further includes a WWAN cellular connectivity module 824 that can work in various standards (2G/3G/4G), various bands, and various modes of operation. The device also includes a WPAN Bluetooth module 822 that is used to communicate with other devices such as smartphones or other multi-sensor electronic device to form a mesh network. The device also includes a WLAN WiFi module 830 that is used to sense WiFi routers/access points, and possibly communicate through those routers if necessary. The device also includes antennas for GPS 816, cellular connectivity 818, WiFi 832, and Bluetooth 820. The cellular antenna could be changed to meet global cellular coverage requirements for 2G, 3G, 4G and 5G connectivity in the future.

The GPS/GNSS receiver 814 can be a separate receiver or incorporated inside the WWAN cellular connectivity module 824. The WPAN module 822 could also be a ZigBee, Z-Wave, 6LoWPAN, or any other personal area network module. The WWAN module could meet one or more any combination of cellular standards such as: GSM, UMTS, CDMA, WCDMA, LTE, LTE-A, LTE-Cat1, LTE-Cat0, LTE Cat-M1, NB-IoT, LTE-MTC, LoRa, Sigfox, and others. WWAN module 824 could also be a LoRA or a Sigfox module that connects to the non-cellular network focused of machine-to-machine (M2M) communications. WWAN module 824 can be any other module that functions in wide area using wireless means of communication.

As noted above, RF transmissions may need to be shut off at certain times, such as during take-off, inflight, and landing of an aircraft. In addition, two independent methods to ensure transmissions are off at certain times may be required.

In embodiments, a sensor device processes data from an accelerometer to detect take-off and landing conditions and uses WiFi SSID and MAC addresses to detect the presence of an aircraft and/or airport. This information can be used to ensure that the device does not transmit during take-off and landing events.

Figure 9:
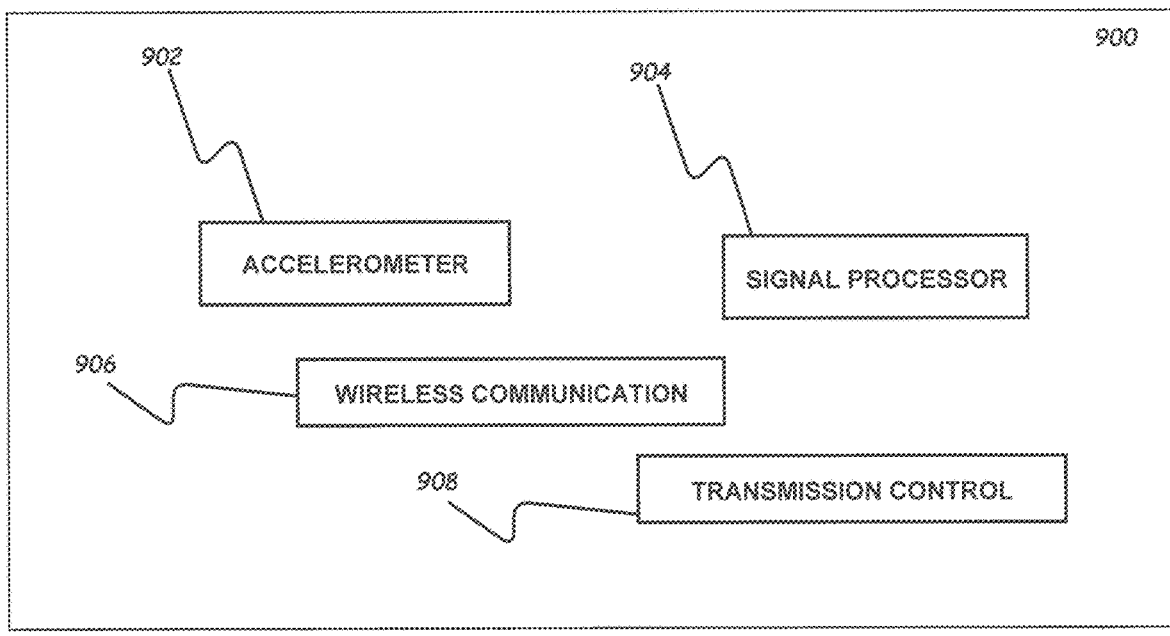
FIG. 9 is a block diagram of an example sensing device having selective prevention of signal transmission.

FIG. 9 shows a block diagram of a simplified sensor device 900 having an accelerometer 902 for obtaining accelerometer data in one or more axes coupled to a signal processor module 904. A wireless communication module 906 receives WiFi SSID and/or MAC address information that can be processed by the signal processor module 904, which can enable and disable a transmission control module 908. As described more fully below, the accelerometer data and the wireless signal information can be used to detect take-off and/or landing conditions and/or aircraft/airport location for controlling the times when device transmissions are permitted.

In embodiments, the sensing device 900 (FIG. 9) accelerometer 902 measures acceleration in at least one axis. In embodiments, the accelerometer 902 senses acceleration in first, second and third axes, e.g., X, Y, and Z axes. Acceleration on the X, Y, and Z axes can be sampled at a predetermined frequency (or sampling period), which can be the same or different for each axis. In one particular embodiment, a sampling frequency is 400 Hz for accelerometer readings In an example embodiment, if the accelerometer 902 detects an acceleration above a threshold of A1 for N1 samples, then aircraft take-off is detected. Similarly, if the accelerometer 902 detects a deceleration above a threshold of A2 for N2 samples, then aircraft landing is detected. After take-off and before landing, the sensing device can be configured not to transmit, as it is in-flight. Another way to detect landing is through multiple shock detections in a short period of time (e.g., 10-15 seconds) when the actual touch down of a plane occurs.

Figure 10:
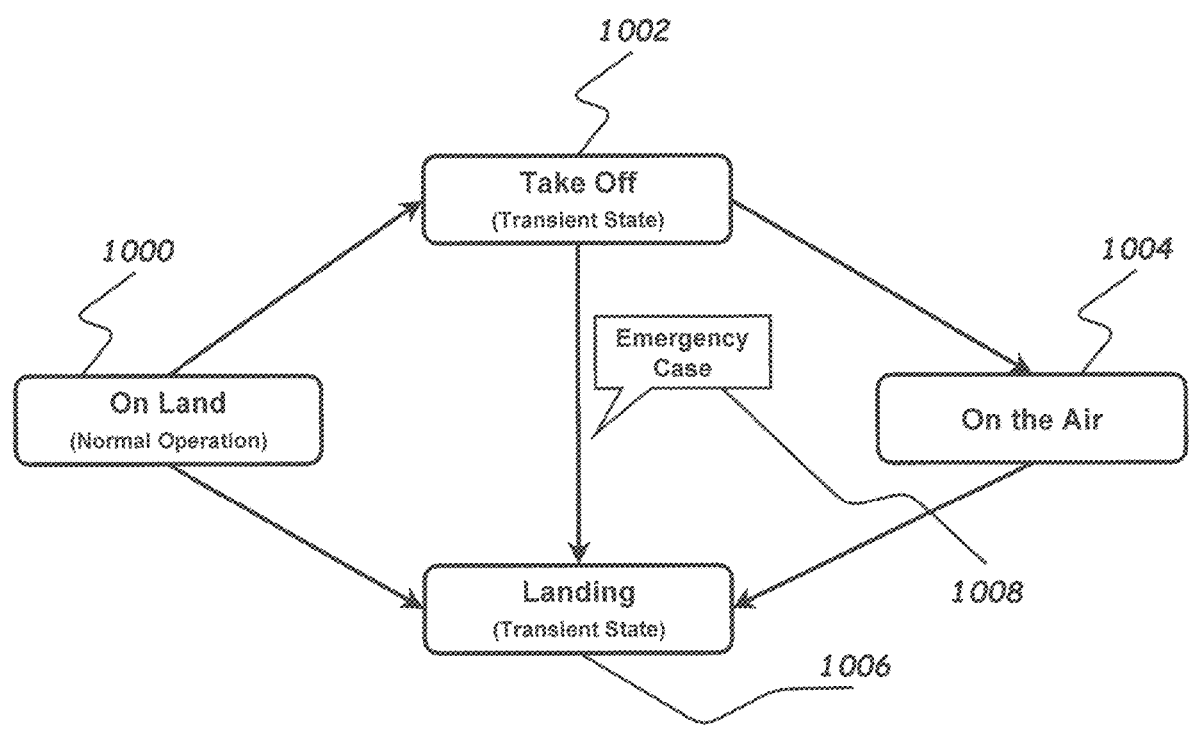
FIG. 10 is a state diagram for example sensing device located at or near an airport and/or aircraft.

FIG. 10 shows an example state diagram for a sensing device, such as the device 100 of FIGS. 1A-1D or device 900 of FIG. 9, which can be located on or in a shipping air cargo container, or an envirotainer, or anywhere else inside an aircraft. In an 'on land' state 1000, which can be considered normal operation, the sensing device can transmit. From the on land state 1000, the sensing device can transition to a take off state 1002, during which the device transmissions should be disabled, followed by an 'in the air' state 1004 during which device transmission may also be disabled. As the aircraft approaches its destination for a landing, the sensing device transitions to a landing state 1006, during which the sensing device should disable transmissions. After the aircraft has landed, the sensing device can transition back to normal 'on land' operation 1000 where device transmissions can be enabled. In embodiments, an emergency can be provided for a transition from takeoff 1002 to landing 1006.

FIG. 11A shows a high-level process for detecting take-off and landing using acceleration information. In step 1100, the sensing device is in an on land state in which signal transmission by the device is permitted. In step 1102, it is determined whether the sensing device is 'touched,' e.g., the device has been subjected to some threshold level of acceleration, usually miniscule so that it detects minor motions on the device, such as motion on automobile, aircraft, or any other type of motion. In embodiments, the device can wake up after being touched. In step 1104, the accelerometer data is monitored and in step 1106, it is determined whether the sensing device is subject to more than a threshold level, such as 0.75 g, of acceleration for longer than a selected amount of time, such as 15 seconds. If not, the sensing device continues to transmit in the on land state in step 1100. If so, the device transitions to the take-off state in step 1108 in which signal transmission by the sensing device is disabled, and then transitions to the in-air state in step 1110.

Once the sensing device is in the on air state, the device monitors the accelerometer data to detect a landing event. In step 1112, the device determines whether the accelerometer data is greater than a selected landing threshold for some given period of time. If not, the device remains in the on air state. If so, in step 1114, the device transitions to the landing state. In embodiments, a path can be provided for an emergency condition in which the device transitions from the landing state to the take-off state. When the accelerometer data indicates that the aircraft/sensing device has been stopped for longer than some period of time, such as one minute, the device transitions in step 1116 to a landed state in which radio signal transmission is permitted. In embodiments, if the sensing device does not sense acceleration for greater than some period of time, such as 16 hours (i.e. long flight), the device transitions to the landed state. After some time, the device transitions back to the on land state 1100.

FIG. 11B shows further details for landing detection. In step 1120, it is determined whether the sensing device has been in the 'in the air' state for more than some period of time, such as 16 hours. It is understood that flights are not expected to last more than some period of time. Embodiments can set a maximum time for 'in the air' to any practical amount of time to meet the needs of a particular application, such as a flight time for predetermined route or leg of a route. If the 'in the air' time exceeds the period of time, the sensing device transitions to the on land state in step 1122 and transmission can be enabled. If the maximum on the air time was not exceeded, the acceleration data can be measured in step 1124. In step 1126, the orientation of the acceleration data is removed and in step 1128 the data is averaged/filtered. In step 1130, it can be determined whether the acceleration data exceeds a selected value Z for greater than X seconds. If so, the sensing device transitions to the landing state in step 1132. If not, processing continues in step 1120. It is understood that Z may be negative acceleration, i.e., deceleration.

In another embodiment of detecting aircraft landing, 1130 can be done by taking two or more consecutive shock events that happen right after the other within a set period between them and a set total length of time. For instance, the device can be configured to detect shock events above 6G, then 4G, then 2G within 10 seconds and at least 0.25 second in between the shock events. The threshold values, the in-between period, and the total length of time can be configured for the device.

FIG. 11C shows further details for take-off detection. In step 1140, a stationary orientation for the sensing device/accelerometer is obtained. In step 1142, it is determined whether the sensing device is 'touched.' If so, in step 1144 the acceleration data is measured after which orientation of the data is removed in step 1146. The data is then averaged/filtered in step 1148, for smoothing for example. In step 1150, it is determined whether the acceleration data is greater than a selected threshold, e.g., 0.75 g, for greater than (Y)(T) seconds. If so, the device transitions to the 'in the air' state in step 1152. If not, in step 1154, it is determined whether there is 'no motion' for some period time Y. It is understood that 'no motion' refers to acceleration being less than some relatively low acceleration threshold level.

If 'no motion' was detected, processing continues in step 1142 to wait for further acceleration data. If motion was detected, processing continues in step 1144 where acceleration is measured, and so on.

FIG. 11D shows an example acceleration data from an accelerometer for take-off and landing of an aircraft. As can be seen, during aircraft take-off, the total acceleration measured by the accelerometer is greater than about 0.75 g for more than N1-N0 samples, which is indicative of aircraft takeoff. During landing, the total acceleration (deceleration) measured by the accelerometer is greater than about −0.75 g for more than N2-N0 samples which is indicative of aircraft landing.

In embodiments, it can be assumed that the orientation of the sensing device does not change once the sensing device/shipping container is placed in the aircraft. In addition, it can be assumed that the device is stationary at power up so that the orientation vector can be removed from the measurements.

In embodiments, the accelerometer data is averaged over some number of samples for smoothing. It is understood that the selected acceleration/deceleration thresholds and time durations can be selected to meet the needs of a particular application and expected conditions. For example, the acceleration threshold can be selected by taking into account the expected type of aircraft, expected turbulence, expected route, expected weather conditions, etc.

It is understood that when the sensing device is placed on a flat surface, the raw data of the accelerometer will generate on one of the axes a 1G output due to gravity. When receiving raw data from the accelerometer, in embodiments the orientation vector and the gravity vector should be removed to enable calculation of the actual acceleration of the device from a 0G reference point.

Figure 12:
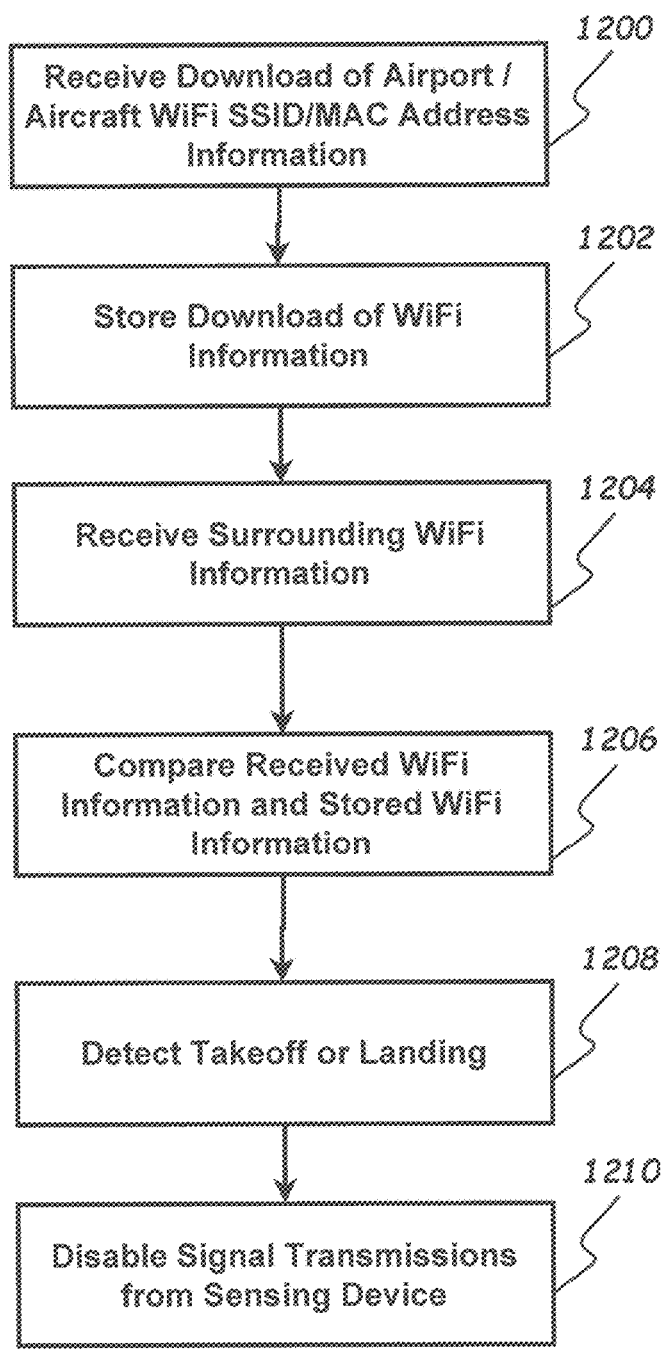
FIG. 12 is a flow diagram of an example process for determining a state of a sensing device at or near an airport and/or aircraft using wireless network identifying information.

FIG. 12 shows an example sequence of steps for determining whether the sensing device is in the vicinity of an aircraft and/or airport using wireless signal information. In embodiments, using wireless signal information is completely independent of using acceleration data.

In step 1200, the sensing device receives downloaded WiFi information corresponding to a given aircraft(s) and/or airports and stores the downloaded information in step 1202. For example, Logan Airport in Boston Mass. has certain wireless networks in operation that have identifying information, such as network SSID and MAC addresses. Any suitably equipped device can receive wireless signals from the local wireless networks. If the identifying information for the wireless networks is known in advance, it can be determined whether a device is in the vicinity of Logan Airport. Similarly, if the identifying information for certain wireless networks associated with particular aircraft is received, it can be determined whether a device is in the vicinity, or inside, of the particular aircraft.

It is understood that multiple routers each having unique MAC Addresses can have the same SSID. For example, multiple Delta aircraft can have the same SSID, however, they have different MAC addresses. If and when available, MAC addresses can be loaded to the sensor to ensure that the exact routers can be identified.

In embodiments, wireless information for a region, such as New England, can be downloaded. It will be appreciated that available memory storage, processor resource availability, power consumption requirements, and the like, may determine the amount of identifying data for airports and/or aircraft downloaded to the sensing device.

In step 1204, the sensing device receives signals from surrounding wireless networks. In step 1206, the sensing device compares the identifying information for the local wireless networks with the downloaded identifying information. If there is matching identifying information, then the sensing device can determine that a take-off or landing event is present or imminent. For example, if the sensing device is located in a shipping container which is near or in an aircraft, the sensing device may receive identifying information for the 'Logan Wifi' network, which was also received as downloaded information, where 'Logan WiFi' is a wireless network in the vicinity of Logan Airport.

In step 1208, a positive comparison between local network identifying information and downloaded network identifying information can be considered as a take-off and/or landing event. In step 1210, the sensing device is then prevented from transmitting signals.

Figure 13A:
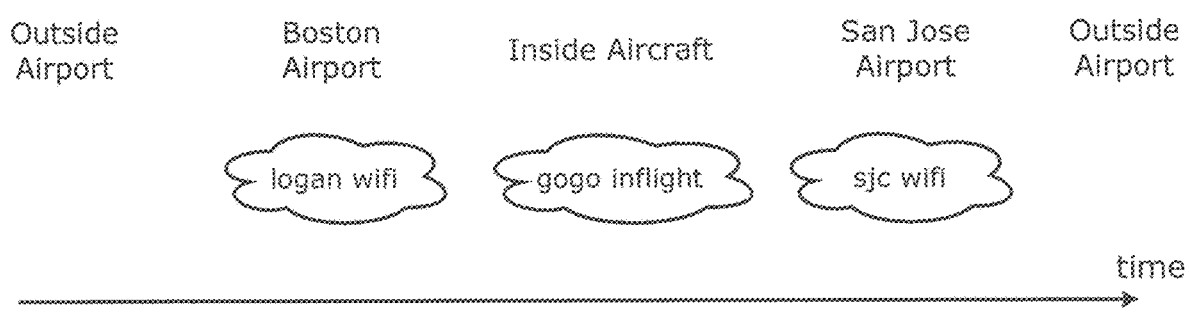
FIG. 13A is a representation of a transition over time as a sensing device arrives into an airport, is placed on an aircraft, and lands at an airport.

FIG. 13A shows an example of wireless network exposure over time for a sensing device. Initially, the sensing device is outside of the airport so that no wireless networks of interest are detected by the sensing device. For example, outside of the airport, if the sensing device performs a comparison of downloaded wireless network information with local wireless networks, there will be no matches. Some period of time later, the sensing device enters a region of the Boston (Logan) Airport covered by a network shown as "logan wifi." If the sensing device performs a comparison with downloaded wireless network information, a match between the downloaded information and "logan wifi' is found. At this point, the sensing device may be configured to disable signal transmissions, however it can continue to measure all sensors and receive WiFi SSIDs, RSSI, and MAC addresses in the vicinity It is understood that wireless network information can be downloaded at a variety of times. For example, a customer may download information to the sensing device upon receipt of the device, when the device is placed on or in a shipping container, when the destination of the shipping container is determined, when a shipping route is determined, when the device is configured for a shipment route, or when connectivity is achieved with a WWAN network,' or at any practical time prior to the time at which the device should cease transmitting signals.

Example SSID download information for Logan Airport includes:
 "LoganWifi"
 "Boston Logan WiFi"
 A list of onboard airline WiFi SSIDs include:
 "Fly-Fi" for JetBlue
 'DeltaWiFi" for Delta Airlines
 "Hainan Airlines" for Hainan Airlines
 "Turk Telekom WiFi Fly" for Turkish Airlines
 "Gogoinflight" for all airlines using GoGo service
 And many others The sensing device can store the list of the downloaded SSID names in memory. In embodiments, the sensing device can sniff the SSID names in the area and compare them with the list in the memory.

Some time later, the sensing device/shipping container may be loaded onto an aircraft after which an inflight wireless network, shown as "gogo inflight." At this point, there may be a positive comparison between the downloaded network information and the onboard aircraft wireless network information. Once the sensing device determines that a positive comparison exists, the device may be configured to cease transmitting signals. In normal operation, during an 'on the air' state, the sensing device should be able to detect the "gogo inflight" network.

Some time later, the aircraft lands at an airport, such as the San Jose airport, and the sensing device/shipping container detects a wireless network named "sjc wifi," which may generate a positive comparison with previously downloaded network identifying information. Once the aircraft is considered landed, such as after some period of time, the sensing device is permitted to transmit signals.

In embodiments, the sensing device may note the change from the first airport wireless network information to the second airport network information to determine that the aircraft has landed. This can happen in combination with the accelerometer sensor, where WiFi detects "logan wifi", then accelerometer detect take-off, and WiFi detects "DeltaWiFi" for instance, this concludes that the device is taken off and is inside an aircraft, after landing the accelerometer detects landing, and WiFi detects "sjc wifi" to conclude landing of the device and it is permittable to transmit again. This can also be configured from the cloud where the shipment route is known, and the device can have pre-loaded WiFi SSIDs for the takeoff and landing destinations/airports.

Figure 13B:
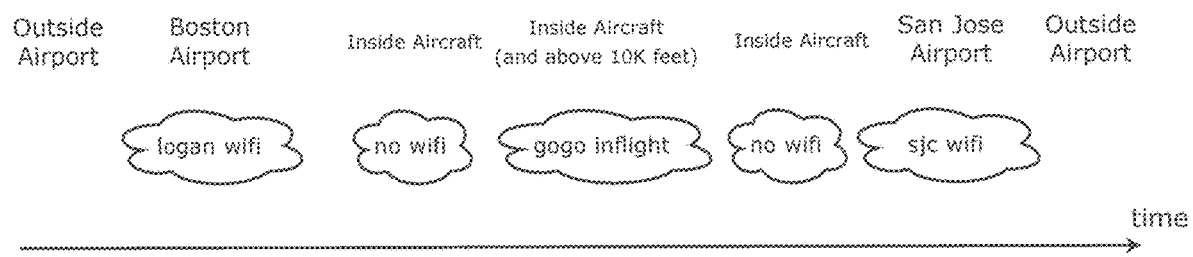
FIG. 13B is another representation of a transition over time as a sensing device arrives into an airport, is placed on an aircraft, and lands at an airport.

FIG. 13B shows another example where WiFi signals are actually not turned on during take-off and landing. WiFi inside the aircraft is turned on when the aircraft reaches 10,000 feet, and it is turned off when it falls below 10,000 feet. In order to get around this challenge, the WiFi signals can be categorized for airport and aircraft SSIDs/MAC addresses, so that the device knows what type of WiFi it has detected. After that the sequencing of the WiFi signal detections can determine where the device is located. If the sequence "logan wifi", "Hainan Airlines", "Shanghai Airport WiFi" is detected, then the device turns off radio transmissions at "logan wifi", and then turns them on at Shanghai Airport. Or if a categorized sequence: airport WiFi, aircraft WiFi, airport WiFi is detected the device will turn off radio transmissions and then on again.

In one embodiment, a button on the device can be utilized. The shipper can be instructed to press the button in a certain way prior to putting inside an aircraft (i.e. press for 3 seconds and hold, double click, triple click), or a separate "Flight Button" could be placed on the device with an LED, so that when a shipper is instructed to push it can enable flight mode. This mode can disable radio transmission, continue readings all the sensors, and also receiving WiFi signals. Once the device has landed, which can be detected as described above, the flight mode is turned off and device will enable radio transmissions. In this embodiment the take-off and on-air are performed manually using the flight button. It should be noted that this meets current IATA/FAA requirements of using two independent methods to detect being inside an aircraft during take-off and landing.

Figure 14:
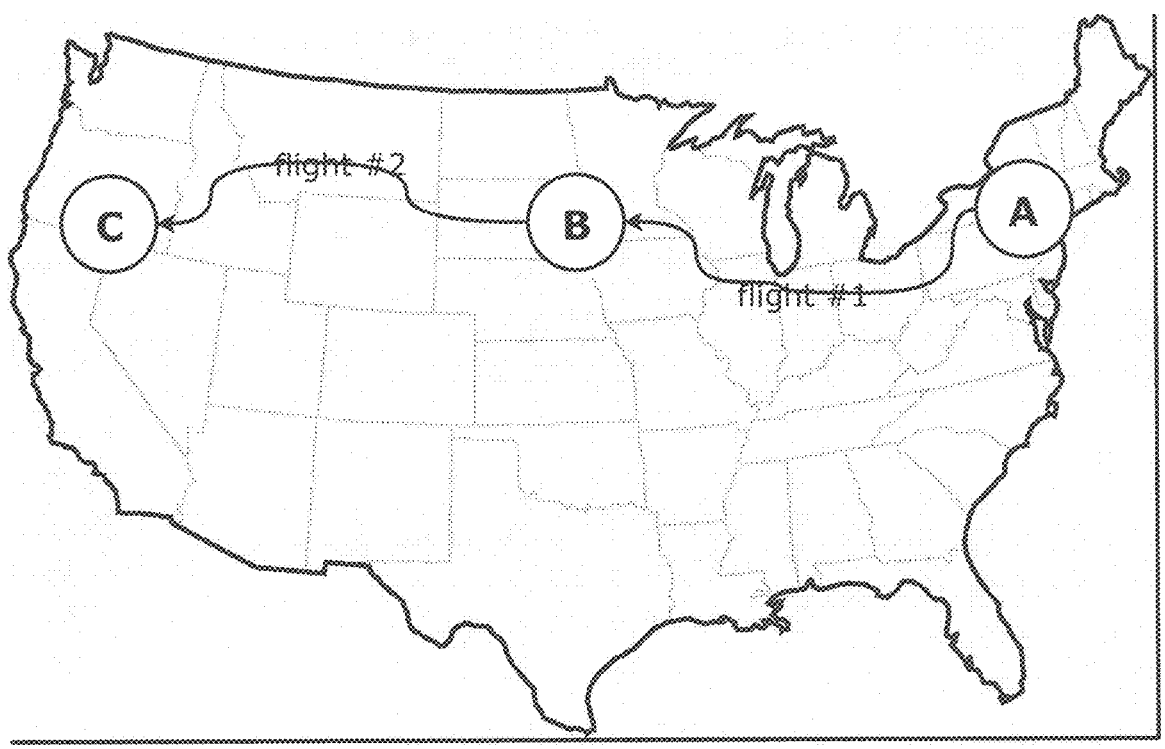
FIG. 14 is a representation of a route of an example sensing device/shipping container.

FIG. 14 shows an example route for a shipping container with an associated sensing device starting at point A, which may correspond to Boston, Mass. While in Boston, prior to take-off, for example, the sensing device downloads network identifying information for points A, B, and C, where B is an intermediate stopover and C is a final destination. For example, at point A, a shipping container and sensing device are prepared for shipment from A to C via B. In embodiments, a customer learns the route for the shipping container and effects the download of network information for teach of A, B, and C, along with any known aircraft inflight wireless network information.

In embodiments, for takeoff detection, when airplane mode is enabled, the sensing device uses two independent methods of detecting take-off, as required by IATA guidelines, where the two modes include use of data from accelerometer and the WiFi receiver. In one embodiment, the sensing device overall operation attempts to detect takeoff mode if any condition below is met, and if so, the sensing device radio shall power-down or not transmit. As shown in FIG. 11, 'touch' of the sensing device initiates acceleration measurements. If acceleration is greater than some threshold for a selected period of time, take-off is deemed to be in process. Take-off is also considered in process so as to disable radio transmission by the device when there is a positive result from a comparison of WiFi SSID+MAC addresses with the downloaded database of known airport/aircraft WiFis indicating that the device is in proximity of an aircraft or airport.

As noted above, a transition to landing can occur from the takeoff state or from the in the air state. If acceleration (or acceleration delta) changes rapidly over a sustained period of time, then the device moves to the on land state. After landing, the device can analyze what airport WiFis are present. While the device is in takeoff, in the air, or landing state, the device remains in the main loop and will not send any radio signals.

In embodiments, a network, which can be referred to "the cloud" can set pre-determined locations where the device resides and where the device is going to reside after the shipment is complete. This data may be available from a customer, for example, setting up a shipment prior to attaching sensing devices to a package. If no shipment data is provided, the sensing device may be turned on before getting inside an aircraft, and thus able to obtain information from the cloud in the area at which the device is currently located. The cloud can then send a list of 50+SSIDs of WiFis, for example, that are in airport locations, including well known airline WiFi names that might be associated with that area.

In embodiments, a sensing device can analyze network SSID names, for example for certain terms, such as "flight," "airport," "fly," "gogo," etc. If the selected words are identified, the sensing device can make a determination that the device is located in or near an aircraft or at an airport and disable signal transmissions. For instance, if the word "airport" is found on one of the SSIDs then the device can determine that it is close or inside an airport, and if the word "fly" or "flight" it can determine that the device is inside an aircraft. This can be used as a safety method to make sure that if by any chance WiFi with these keywords is detected the device can disable radio transmissions for a set period of time.

In embodiments, in order to enhance and maintain the accuracy of SSID/Mac Address in the airport and aircraft locations, the sensing device can store locally received WiFi SSIDs so that when it is permissible to transmit back to the cloud the SSID database can be updated with new SSIDs. In addition, a custom receiving amplifier could also be placed in front of the WiFi receiver to amplify signals that are present that cannot be detected with the receiver low noise amplifier that is inside the WiFi chipset or module.

FIG. 15 shows an exemplary computer 1500 that can perform at least part of the processing described herein. The computer 1500 includes a processor 1502, a volatile memory 1504, a non-volatile memory 1506 (e.g., hard disk), an output device 1507 and a graphical user interface (GUI) 1508 (e.g., a mouse, a keyboard, a display, for example). The non-volatile memory 1506 stores computer instructions 1512, an operating system 1516 and data 1518. In one example, the computer instructions 1512 are executed by the processor 1502 out of volatile memory 1504. In one embodiment, an article 1520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
processing acceleration data of a sensing device to determine whether the device is located on an aircraft during landing or taking off or in the air or landed;
preventing the sensing device from transmitting signals when the aircraft is determined from the acceleration data to be taking off or landing;
comparing network identifying information stored in memory of the sensing device and locally received network identifying information; and
for at least one positive comparison of the network identifying information stored in the memory and the locally received network identifying information, preventing the sensing device from transmitting signals.

2. The method according to claim 1, further including enabling signal transmissions by the sensing device when the aircraft is landed.

3. The method according to claim 1, wherein preventing the sensing device from transmitting signals from the acceleration data and from the network identifying information are independent of each other.

4. The method according to claim 1, wherein preventing the sensing device from transmitting signals when the aircraft is taking off or landing requires at least one positive comparison of the network identifying information stored in the memory and the locally received network identifying information and a determination that the device is located on an aircraft during landing or taking off from the acceleration data.

5. The method according to claim 1, wherein processing the acceleration data of the sensing device further includes detecting acceleration above a first threshold for more than a first selected number of samples per time period to determine that the aircraft is taking off.

6. The method according to claim 1, wherein processing the acceleration data of the sensing device further includes detecting deceleration above a second threshold for more than a second selected number of samples per time period to determine that the aircraft is landing.

7. The method according to claim 1, wherein processing the acceleration data of the sensing device further includes detecting a given number of shocks within a given time interval to determine that the aircraft is landing.

8. The method according to claim 7, wherein the shocks decrease in magnitude over time.

9. The method according to claim 1, further including enabling transmissions by the sensing device when a duration of the sensing device in the in air state exceeds a given amount of time.

10. The method according to claim 1, wherein the stored network identifying information includes SSIDs.

11. The method according to claim 10, wherein the stored network identifying information includes a first one of the SSIDs having multiple MAC addresses.

12. The method according to claim 1, further including identifying a sequence of locally received network identifying associated with a route to determine that the aircraft has landed.

13. The method according to claim 1, wherein the network identifying information stored in memory of the sensing device is associated with an expected route for the aircraft.

14. The method according to claim 1, further including identifying a location of the sensing device from the locally received network identifying information, which includes at least one SSID having geographic identifying information.

15. The method according to claim 14, wherein the geographic identifying information of the SSID includes a city name and/or airport name.

16. The method according to claim 1, further including storing and transmitting the locally received network identifying information.

17. The method according to claim 1, further including receiving a signal generated from actuation of a button on the sensing device indicating that the sensing device is being shipped.

18. A sensing device, comprising:
an accelerometer module to sense acceleration data;
a signal processor module coupled to the accelerometer module and configured to process the acceleration data for determining whether the sensing device is located on an aircraft during landing or taking off or in the air or landed;
a transmission control module coupled to the signal processor module and configure to prevent the sensing device from transmitting signals when the aircraft is determined from the acceleration data to be taking off or landing; and
a wireless communication module coupled to the signal processor module and configured to compare network identifying information stored in memory of the sensing device and locally received network identifying information,
wherein the transmission control module is further configured to, for at least one positive comparison of the network identifying information stored in the memory and the locally received network identifying information, prevent the sensing device from transmitting signals.

19. A system, comprising:
a sensing device, comprising:
an accelerometer module to sense acceleration data;
a signal processor means coupled to the accelerometer module for processing the acceleration data for determining whether the sensing device is located on an aircraft during landing or taking off or in the air or landed;
a transmission control means coupled to the signal processor means for preventing the sensing device from transmitting signals when the aircraft is determined from the acceleration data to be taking off or landing; and
a wireless communication means coupled to the signal processor means for comparing network identifying information stored in memory of the sensing device and locally received network identifying information,
wherein the transmission control means, for at least one positive comparison of the network identifying information stored in the memory and the locally received network identifying information, prevents the sensing device from transmitting signals.

* * * * *